(12) United States Patent
McLaughlin et al.

(10) Patent No.: US 8,171,413 B2
(45) Date of Patent: May 1, 2012

(54) SYSTEM AND METHOD FOR DISPLAYING INFORMATION ABOUT SUBNETS

(75) Inventors: Michael Bruce McLaughlin, Bradenton, FL (US); William Brian Kersey, III, Bradenton, FL (US)

(73) Assignee: Manatee County, a political subdivision of the State of Florida, Bradenton, FL (US)

( * ) Notice: Subject to any disclaimer, the term of this patent is extended or adjusted under 35 U.S.C. 154(b) by 994 days.

(21) Appl. No.: 12/060,950

(22) Filed: Apr. 2, 2008

(65) Prior Publication Data
US 2009/0254833 A1 Oct. 8, 2009

(51) Int. Cl.
*G06F 3/00* (2006.01)

(52) U.S. Cl. ........ 715/734; 715/735; 715/736; 715/737; 715/738; 715/739

(58) Field of Classification Search ........... 715/734–739
See application file for complete search history.

(56) References Cited

U.S. PATENT DOCUMENTS

| | | | | |
|---|---|---|---|---|
| 5,751,971 | A * | 5/1998 | Dobbins et al. | 709/238 |
| 6,608,635 | B1 * | 8/2003 | Mumm | 715/736 |
| 7,082,473 | B2 * | 7/2006 | Breitbart et al. | 709/241 |
| 7,310,666 | B2 * | 12/2007 | Benfield et al. | 709/223 |
| 7,315,985 | B1 * | 1/2008 | Gauvin et al. | 715/734 |
| 7,493,562 | B2 * | 2/2009 | Kui et al. | 715/736 |
| 7,523,189 | B2 * | 4/2009 | Boylan et al. | 709/223 |
| 7,607,093 | B2 * | 10/2009 | Blomquist | 715/736 |
| 7,890,869 | B1 * | 2/2011 | Mayer et al. | 715/736 |
| 2004/0039844 | A1 * | 2/2004 | Bonn | 709/245 |
| 2004/0143658 | A1 * | 7/2004 | Newton et al. | 709/224 |
| 2005/0172024 | A1 * | 8/2005 | Cheifot et al. | 709/225 |
| 2008/0212597 | A1 * | 9/2008 | Baryshnikov et al. | 370/408 |

* cited by examiner

*Primary Examiner* — Ryan Pitaro
(74) *Attorney, Agent, or Firm* — Jacox, Meckstroth & Jenkins

(57) ABSTRACT

An interface for a database. The database contains information about subnets in a large network, such as the Internet. The interface displays the information in a hierarchical fashion. However, because all subnets cannot be displayed on a display at once, some subnets are displayed, and a user reaches other subnets by calling for subsets of the subnets displayed.

18 Claims, 29 Drawing Sheets
(18 of 29 Drawing Sheet(s) Filed in Color)

FIG 3

| First IP Address | Last IP Address | Network Notation |
|---|---|---|
| 00000000.00000000.00000000.00000000<br>0.0.0.0 | 11111111.11111111.11111111.11111111<br>255.255.255.255 | 0.0.0.0/0 |

FIG 4A

| First IP Address | Last IP Address | Network Notation |
|---|---|---|
| 0000000.00000000.00000000.00000000<br>0.0.0.0 | 01111111.11111111.11111111.11111111<br>127.255.255.255 | Subnet 1<br>0.0.0.0/1 |
| 1000000.00000000.00000000.00000000<br>128.0.0.0 | 11111111.11111111.11111111.11111111<br>255.255.255.255 | Subnet 2<br>128.0.0.0/1 |

FIG 4B

| First IP Address | Last IP Address | Network Notation |
|---|---|---|
| 000000.00000000.00000000.00000000<br>0.0.0.0 | 001111111.11111111.11111111.11111111<br>63.255.255.255 | Subnet 1<br>0.0.0.0/2 |
| 010000.00000000.00000000.00000000<br>64.0.0.0 | 01111111.11111111.11111111.11111111<br>127.255.255.255 | Subnet 2<br>64.0.0.0/2 |
| 100000.00000000.00000000.00000000<br>128.0.0.0 | 10111111.11111111.11111111.11111111<br>191.255.255.255 | Subnet 3<br>128.0.0.0/2 |
| 110000.00000000.00000000.00000000<br>192.0.0.0 | 11111111.11111111.11111111.11111111<br>255.255.255.255 | Subnet 4<br>192.0.0.0/2 |

FIG 6

| RANGE | SUBNET | | | | HOSTS |
|---|---|---|---|---|---|
| 0 | 0.0.0.0 | | | | 4.29E9 |
| 1 | 0.0.0.0 | | 128.0.0.0 | | 2.15E9 |
| 2 | 0.0.0.0 | 64.0.0.0 | 128.0.0.0 | 192.0.0.0 | 1.07E9 |

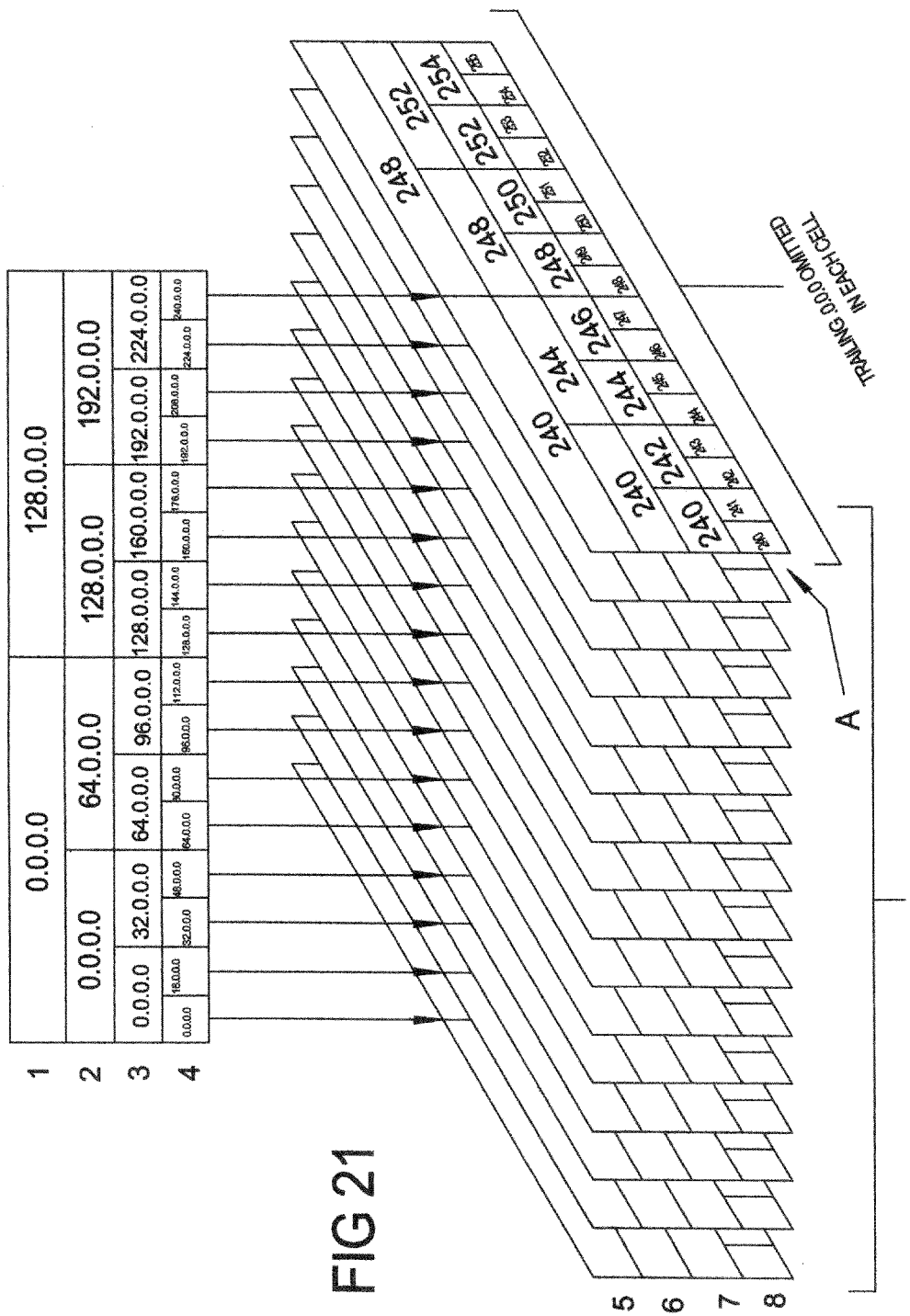

FIG 23

SYSTEM AND METHOD FOR DISPLAYING INFORMATION ABOUT SUBNETS

BACKGROUND OF THE INVENTION

1. Field of the Invention

The invention concerns a system for displaying information about super networks, sub-networks or subnets in a large network, such as an internal network within in an organization or an external network, such as the Internet, wherein the network has many hosts and devices, such as servers, printers, computers and the like and maintaining the subnets.

2. Description of the Related Art

A sub-network or subnet is defined within the Internet Protocol version Four (IPv4) specifications. Proper planning and administration of subnets has become critical for efficient design and implementation of IPv4 based data communications networks. All subnets in such a large network cannot be displayed simultaneously on an ordinary desktop computer monitor.

Internet protocol version four (IPv4) specifies an IP address that consists of thirty two (32) bits. Using these thirty two bits, a total of 4,294,967,295 (2 to the power of 32) unique IP addresses can be created. To simplify how an IP address is represented, these thirty two bits are divided into four sections of eight bits each called octets and if each octet of the IP address is converted from a binary number to a decimal number, the result is known as dotted decimal notation. An example of an IP address being converted from binary to dotted decimal is shown in FIG. 1. Except for FIGS. 3 and 4 dotted decimal notation will be used herein for ease of understanding.

As shown in FIG. 27, a decimal number, such as the number 589, is actually short-hand notation for a sum of numbers (500+80+9). As indicated, this can be rewritten as (5×100)+(8×10)+(9×1).

This can be further re-written as (5×102)+(8×101)+(9×100), wherein the symbols "" indicate the operation of raising to a power, and the number following "**" is the exponent indicating the power.

Any number raised to the zero power is, by definition, unity, that is, one.

Thus, as indicated in FIG. 27, each position can be assigned an exponent.

In the binary number system, the same pattern applies, except that only two numbers are used, namely, 1 and 0. As indicated, the binary number 1101 represents the decimal number 13.

The right side of FIG. 27 indicates the binary numbers from 0000 to 1111 and their decimal equivalents.

FIG. 2 depicts a simple IP network. In an IP network each host device (computer, printer, server, etc) or packet router interface requires a unique address, such as the internet protocol address (IP address). This insures that data packet transmission can occur between hosts without conflict or errors. Data packets being transmitted between hosts within a single network do not require routing. Data packets being sent to an IP address outside the local network must be processed by a router and relayed to a destination network. For example, if data packets are being exchanged between a PC 192.68.0.2 (FIG. 2) and printer 192.68.0.1, no routing is required. In contrast, if data packets are being exchanged between hosts in different networks (e.g. 192.68.0.2 and 145.10.34.1) routing is required. Routers are used to connect two or more networks. Each interface on a router must also have an IP address.

FIG. 3 shows a first IP address and a last IP address of the IPv4 specification in both binary and dotted decimal form. The network notation for the IPv4 network that contains all IP addresses is shown in the third (right) column. The network notation consists of the first IP address of a network in dotted decimal form followed by a forward slash and then a sub-network (subnet) range. The subnet range tells how many bits of the IP address, beginning with the most significant bit, are to be used for a "Network ID." The number of subnets can be determined by using the subnet range as the exponent of 2, and 2-to-the-power-of-zero equals one, by definition. In this example of FIG. 3, there is only one network and all bits in the IP address can be used as a host identification address (Host ID). The number of Host IDs supported by a network or subnet can be determined by subtracting the subnet range from 32 (the total number a bit in an IP address) and using that result as the exponent of 2. In the illustration, 2 to the power of (32−0)=4,294,967,295 Host IDs available.

The Internet is made up of multiple networks, requiring that the IPv4 address space be subdivided. This is done by increasing the subnet range and thereby increasing the number of bits in an IP address that can be used for a Network ID. FIG. 4A shows an example of how the IPv4 address range is divided into two subnets. The subnet range is one (1) which means that the most significant bit (i.e., the left-most bit) in the IP address is used for the Network ID. The dashed boxes in FIGS. 4A and 4B indicate the ranges, with the first and last address and all addresses therebetween being available for allocation as a host address. The Network ID for subnet 1 is zero (0) (i.e., the range indicated in the dashed box) and the Network ID for subnet 2 is one (1) (again indicated by the dashed box). The remaining bits in the IP address are available to be used as Host IDs. Each of these two subnets can contain up to 2,147,483,647 [e.g. 2 to the power of (32−1)] Host IDs.

FIG. 4B shows a further subdivision of the IPv4 address space. In this figure the subnet range has been increased to two. This means that the two most significant bits in the IP address are used to determine the Network ID. These two bits allow four unique combinations, 00, 01, 10, and 11. The remaining 30 bits in the IP address are available for Host ID within each of these subnets.

FIG. 5A depicts the hierarchical relationship between subnets. To simplify the diagram and illustration, the last three octets have been replaced with "X". The Network ID of each subnet is indicated by a dashed box. As stated earlier, the number of bits used for the Network ID is known as the subnet range. The subnet range for row 1 of FIG. 5A is zero (0), for row 2 it is one (1), and for row 3 it is two (2). Again, notice that the most significant bits of the IP address are used for the Network ID. The number of those bits used is specified by the subnet range. Networks 00 and 01 are subnets of network 0 and networks 10 and 11 are subnets of network 1. A network is subdivided by adding one additional bit to the Network ID.

Thus, a hierarchy of subnets exists and this hierarchy of subnets can be represented using the network notation is shown in FIG. 5B. In FIG. 5B, the X's of FIG. 5A are given the specific values of zero. In general, each X of FIG. 5A represents a binary number ranging from 00000000 (decimal 0) to 11111111 (decimal 255).

The four entries in the bottom row of FIG. 5B, contain the prefixes 0, 64, 128, and 192, reading left-to-right in the figure. These are the dotted decimal values of the corresponding prefixes (i.e., the eight-bit binary numbers preceding the first decimal points) in the bottom row of FIG. 5A. For example, the binary number 01000000 in the second entry in the bottom row of FIG. 5A corresponds to the 64 in the second entry in the bottom row of FIG. 5B.

Networks 0.0.0.0/2 and 64.0.0.0/2 are considered children or subnets of network 0.0.0.0/1. Likewise networks 0.0.0.0/1 and 128.0.0.0/1 are subnets of network 0.0.0.0/0. This relationship between a subnet and its parent network is known in networking as "summarization." The parent network is sometimes referred to as a "supernet." Network 64.0.0.0/2 summarizes to 0.0.0.0/1 and network 0.0.0.0/1 summarizes to 0.0.0.0/0. This hierarchical relationship between networks is important in planning, implementing and administering large data communication system composed of many subnets.

Unfortunately, given the vast number of IP addresses, maintaining, visualizing, tracking, allocating, reserving and monitoring such addresses was very difficult and time consuming. Also, because of the size of the network, not all subnets could be displayed simultaneously or in any easy-to-read manner.

There is, therefore, a need to provide a system and method that overcomes one or more of the problems of the past.

SUMMARY OF THE INVENTION

One purpose of the invention is to provide a unique method and a related system for displaying, navigating, and administering a database composed of IP address, subnet objects, their attributes and relationships to one another.

The invention allows a user to select hidden subnets for a display, by selecting supernets to which the desired subnets belong.

An object of the invention is to provide an improved system for displaying relationships among subnets in a large network.

A further object of the invention is to provide a system which can selectively display information about individual subnets in a network.

In one aspect, this invention comprises a system for presenting information about subnets in a network, comprising a display which represents some of the subnets; and a system for detecting selection of a displayed subnet A by a user and, in response, displaying a subset A of subnet A.

In another aspect, this invention comprises, for a network that contains too many subnets to represent on a desktop display simultaneously, a method of presenting information about the subnets comprising on a display, presenting some of the subnets, but not others; and detecting selection of a subnet by a user and, in response, displaying a subset of the selected subnet.

In still another aspect, this invention comprises a method of presenting information about subnets in a network, comprising assigning to each subnet an address, the addresses being definable into a binary tree, displaying several ranges of addresses, accepting a selection of a range by a user and, in response, displaying a subset of the selected address; and displaying information about subnets in the subset.

In yet another aspect, this invention comprises a system for presenting information about subnets in a network, comprising a display which presents at least a first frame of information about a group of N subnets; and a system for detecting selection of a subnet in said first frame, and presenting at least a second frame which displays information about N different subnets, and which different subnets are a subset of the selected subnet.

In still another aspect, this invention comprises a method of presenting information about subnets in a network, comprising establishing a network tree which represents the subnets; for a first group G1 of levels in the tree, displaying a first plurality of icons P1, one representing every subnet in G1, for a second group G2 of levels in the tree, displaying a second plurality of icons, which represent some, but not all, of the subnets in G2, when a user selects an icon S1, displaying P1, and displaying icons representing a third plurality of icons which subtend S1.

In yet another aspect, this invention comprises a method of displaying information about subnets in a network, comprising generating a binary tree having multiple levels of nodes, each node being assigned a coordinate of (L, N), in which L represents level number, and N represents position in level L, displaying a first frame, which includes icons representing all nodes in levels L1 through LA inclusive, displaying icons which represent nodes which subtend a node in level LA, then accepting a selection of a node by a user in a level ranked in or below LA, and in response, displaying the first frame; and icons which represent nodes subtending the selected node.

In still another aspect, this invention comprises a method of displaying information about subnets in a network, comprising generating a binary tree having nodes which represent subnets, each node representing a subnet; and accepting a sequence of selections of nodes by a user, which sequence indicates one of 2E32 available nodes, and, in response, displaying a node representing that indicated by the sequence.

These and other desires and advantages of the invention will be apparent from the following description, the accompanying drawings and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates how an IP address is customarily re-written in network notation;

FIG. 4A illustrates division of a 32-bit address space into two subnets;

FIG. 4B illustrates division of a 32-bit address space into four subnets;

FIG. 6 illustrates a re-arrangement of the data of FIG. 5B, with added information;

FIGS. 7-19 illustrate various displays generated by the invention, in presenting information about subnets;

FIGS. 21-26 are an elaboration of FIG. 7, and illustrate in greater detail the data which FIG. 7 makes available to the user;

FIG. 21 is a representation of ranges 5-8, subtending from all cells in range 4;

FIG. 22 is a representation of ranges 9-12, subtending from cell 0 in range 8. The trailing "0.0.0.0" have been omitted in ranges 5-8;

FIG. 23 is a representation of ranges 9-12, subtending from cell 15 in range 8. The trailing "0.0.0.0" have been omitted in ranges 5-8;

FIG. 24 is a representation of all ranges 9-12, subtending from range 8, including those of FIGS. 22 and 23;

FIG. 25 represents ranges 13-16, subtending from cell 0.0.0.0 in range 12;

FIG. 26 represents all ranges 13-16 subtending from range 12;

DETAILED DESCRIPTION OF THE INVENTION

Figure 1:
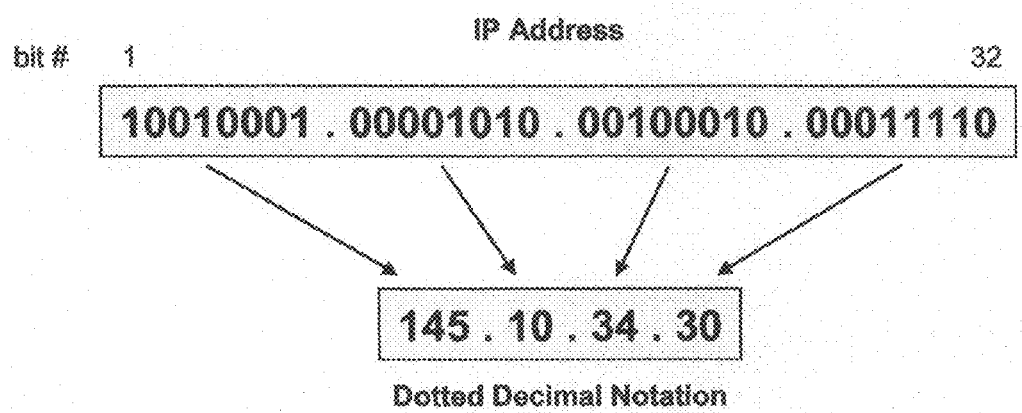
FIG. 1 illustrates the format of an IP, Internet Protocol, address, as a 32-bit number, and also how the 32-bit number is re-written in dotted decimal notation.
Figure 2:
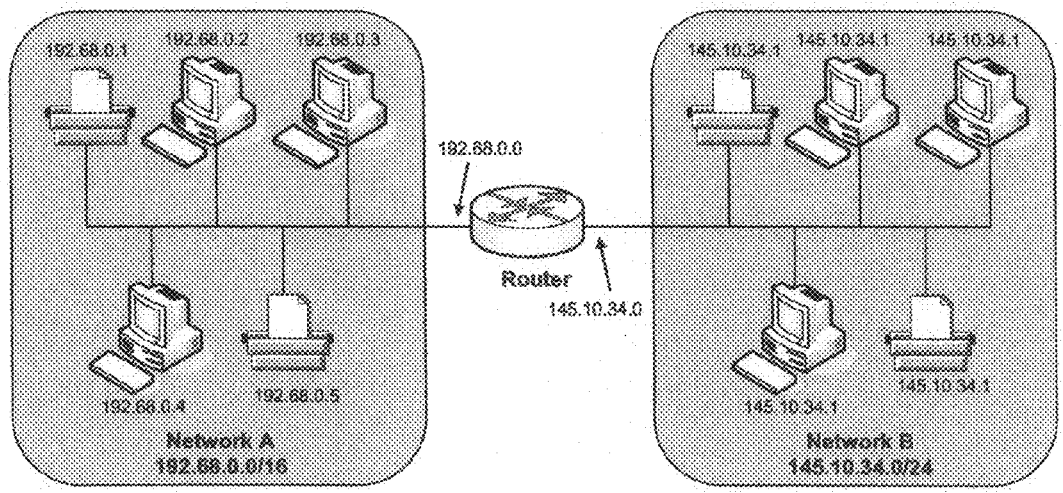
FIG. 2 illustrates two networks.
Figure 5A:
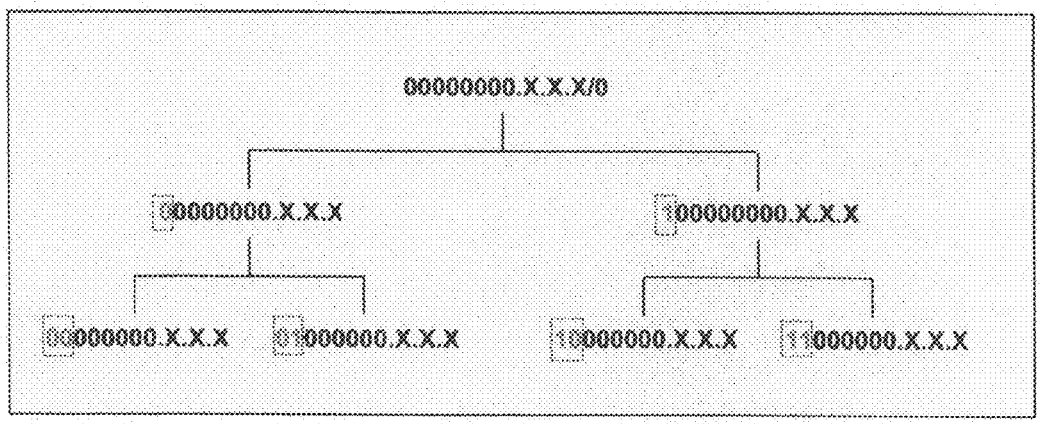
FIG. 5A illustrates the four subnets of FIG. 4B in a binary tree format, or hierarchical format.
Figure 5B:
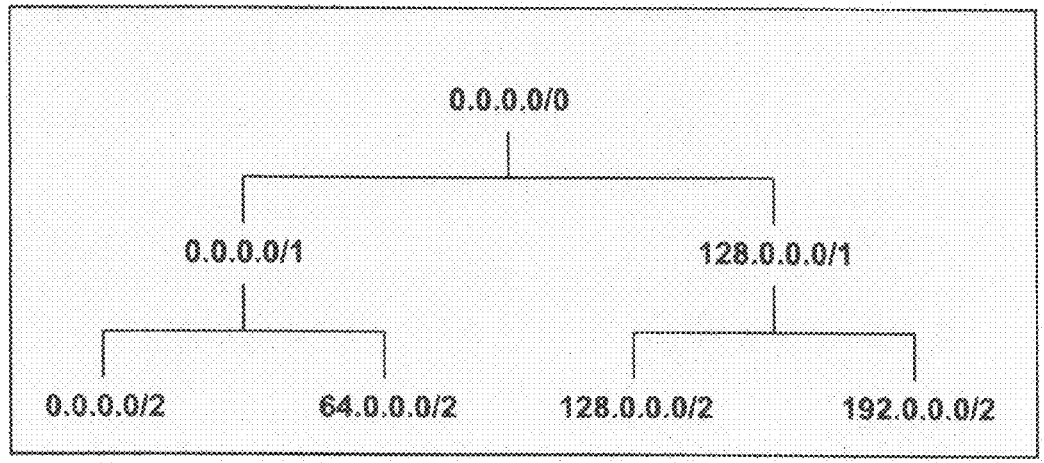
FIG. 5B illustrates the arrangement of FIG. 5A, but written in dotted decimal notation.

Referring now to FIGS. 6-29, various embodiments of the invention are shown and described. FIG. 6 illustrates a unique visual representation of the relationship among subnets and supernets. The first column 10 labeled "RANGE" contains the subnet range for each network in a given row. In the rows under the column 12 header "SUBNET" the dotted decimal notation of the first IP address for each of the subnets within a range is displayed. The last column 14 labeled "HOSTS" provides the number of Host IDs supported by the subnets within that row. As an example, the last row in FIG. 6 contains four subnets labeled 0.0.0.0, 64.0.0.0, 128.0.0.0, and 192.0.0.0. Their subnet range is two (2) and each subnet can support up to 1,073,741,823 (approximately 1.07E9) Host IDs.

It is noted that the number of "HOSTS" for "RANGE" of 1 (i.e., the second row in FIG. 6) is one-half the number of "HOSTS" for "RANGE" of 0 (i.e., the first row in FIG. 6). The reason is that the number of "HOSTS" in the first row has been divided into two groups, namely, those of the second row. Similarly, the number of "HOSTS" for "RANGE 2" (i.e., the third row) is one-half the number of "HOSTS" for "RANGE" 1 (i.e., the second row) and so on.

Figure 7:
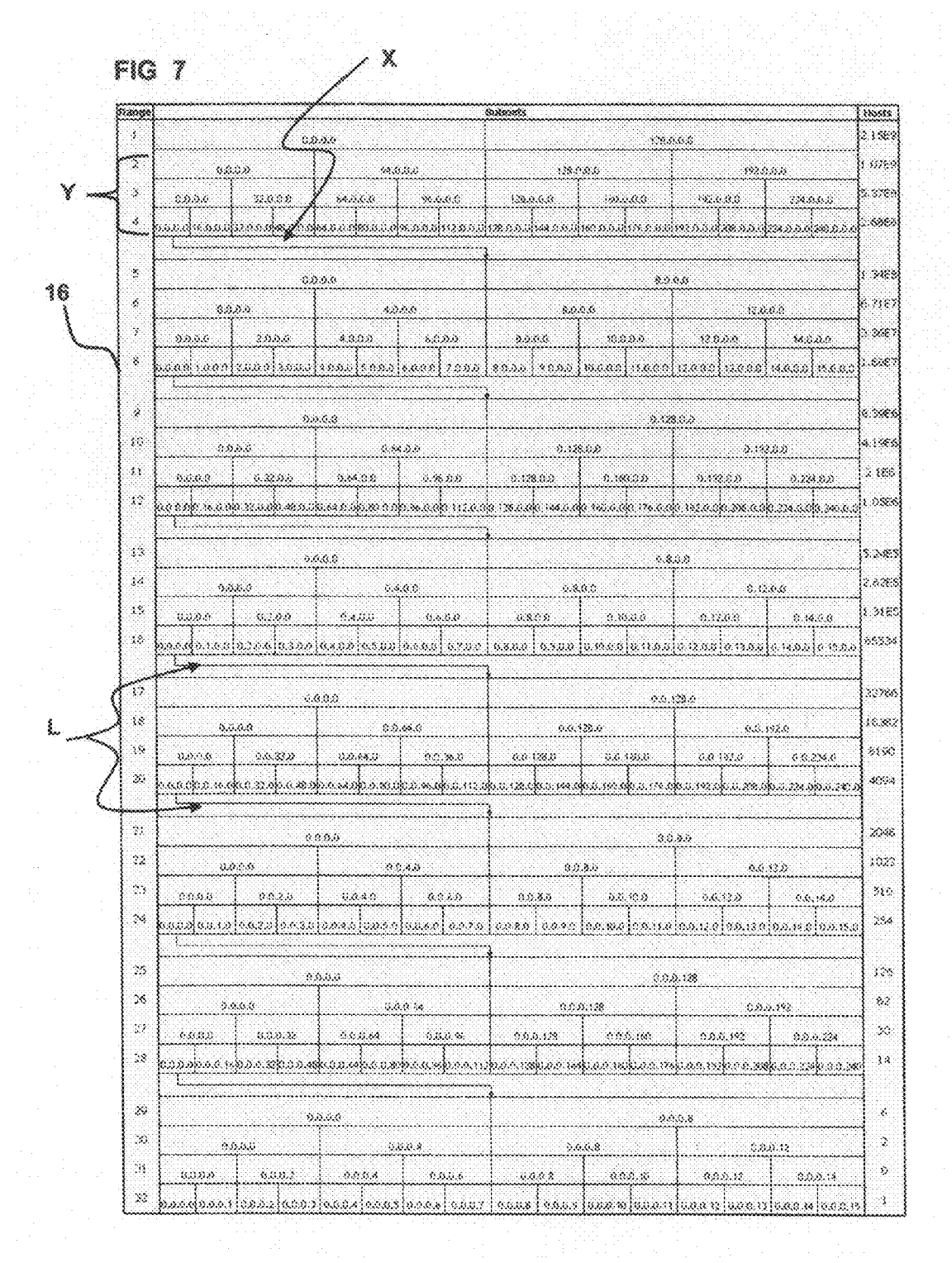

By using the subnet display concept in FIG. 6 and introducing a hierarchical indicator (an arrowed line L), a novel system and method of displaying subnets and their relationships is shown in FIG. 7. FIG. 7 contains 32 rows divided into eight sets of four rows each is presented in a graphical user interface (GUI) or display 16. From top to bottom, the four rows of each set contain the Network IDs for 2, 4, 8, and 16 subnets respectively. The hierarchical relationship of subnets between each set of rows is indicated by the arrowed line L. As an example, the subnets within the second set of rows, identified by arrow X in FIG. 7, are linked to the parent subnet 0.0.0.0/4 in the last row of the first set of four rows, labeled Y in FIG. 7. This display methodology repeats six more times linking the remaining sets of rows and their associated subnets.

Figure 19:
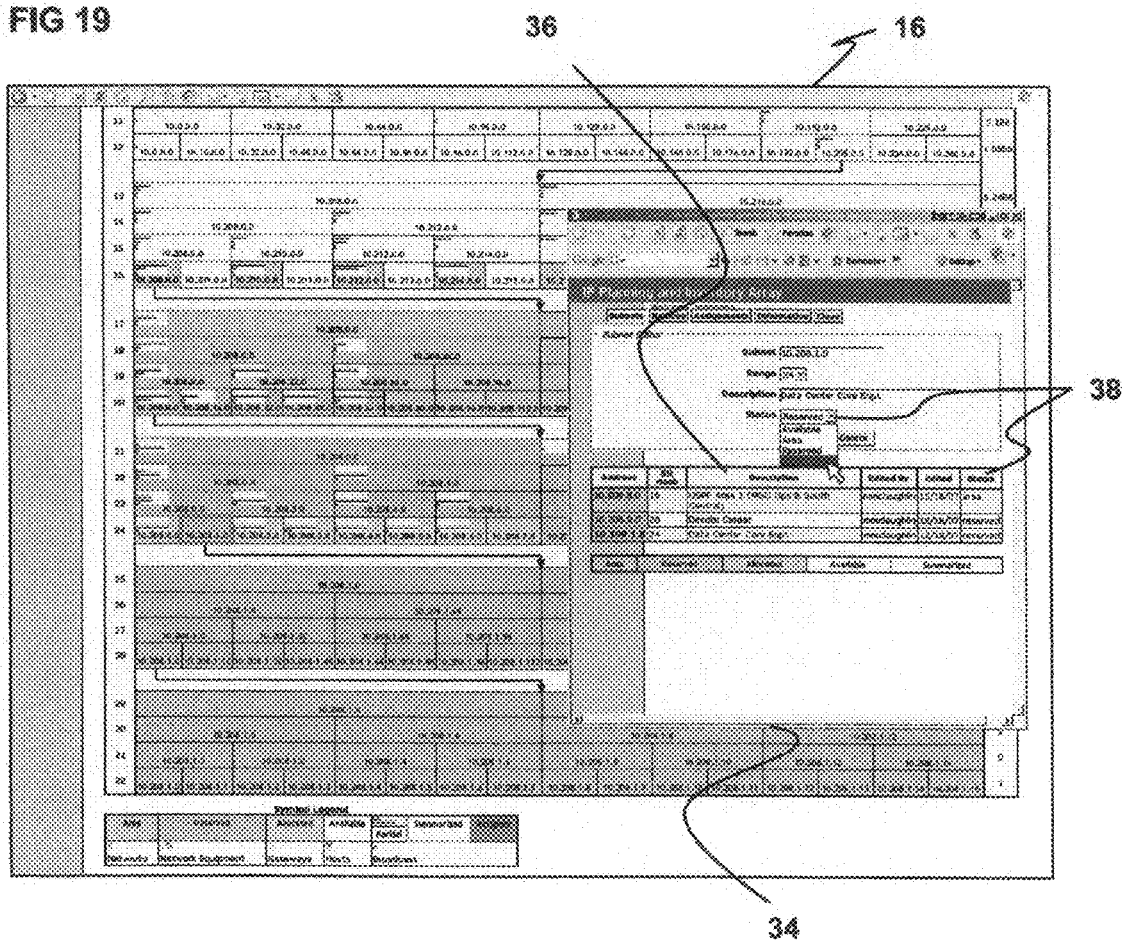
Figure 20:
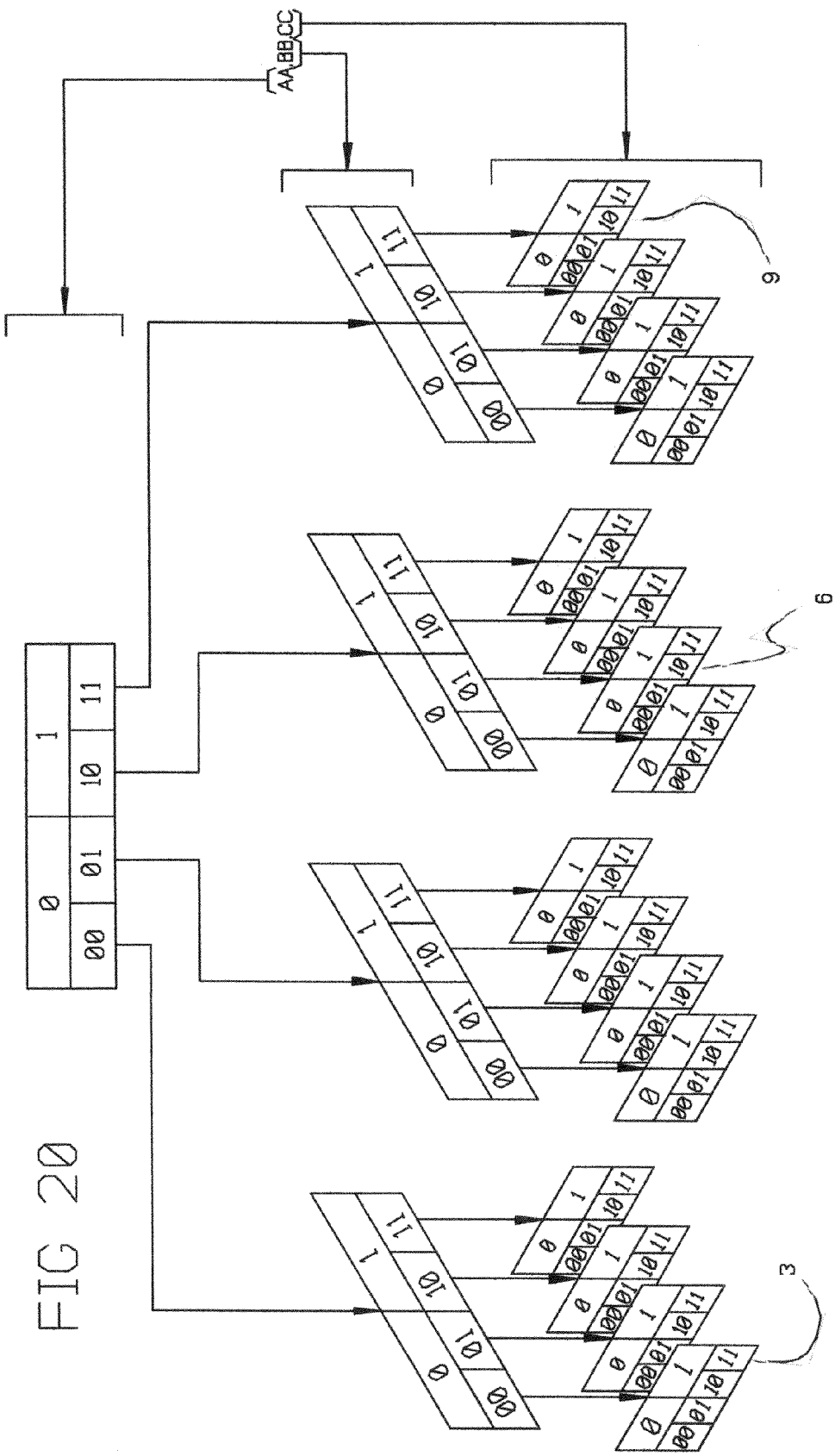
FIG. 20 is a simplified view of a display of the type generated by the invention, for an IP address of XX.XX.XX, namely, a six-bit address.

For ease of understanding the illustration, FIG. 20 provides a simplification representing one of the concepts utilized by the display of FIGS. 7-19. In FIG. 20, a hypothetical IP address is presented in the format AA.BB.CC, wherein AA, BB, and CC each represent a two-bit binary number or a doublet.

Cell 3, for example represents a subnet and has an address 00.00.11, as indicated. Cell 6 has an address 10.01.10. Cell 9 has an address 11.11.10. FIG. 7 follows the same pattern, but using a longer IP address, namely, the four octets described earlier.

In FIG. 20, the cells labeled 00, 01, 10, and 11 in doublet AA are analogous to the cells in range 2 in FIG. 7. FIG. 20 illustrates the fact that each of those cells leads to another set of subnets, namely, those labeled 0 and 1 in doublet BB. The same principle applies to FIG. 7.

The visual representation of display 16 can be used to quickly navigate through all subnets definable by the IPv4 specification. This unique method, related system and display 16 greatly simplifies subnet planning and administration for large data communication system, such as a system based on IPv4, network summarization and modern routing protocols such as Open Shortest Path First (OSPF).

A more detailed explanation of FIG. 7 is provided later herein in the Section entitled "Additional Considerations."

To best understand this method, system and display 16 and its use, the reader should envision each of FIGS. 7-19 as a graphical user interface (GUI) 16 displayed on a monitor (not shown) of a computer system (not shown) composed of a display, a computing application, and a relational database. A system based on this method allows a user to select objects on the display, specifically those subnet blocks containing dotted decimal notation.

Figure 8:
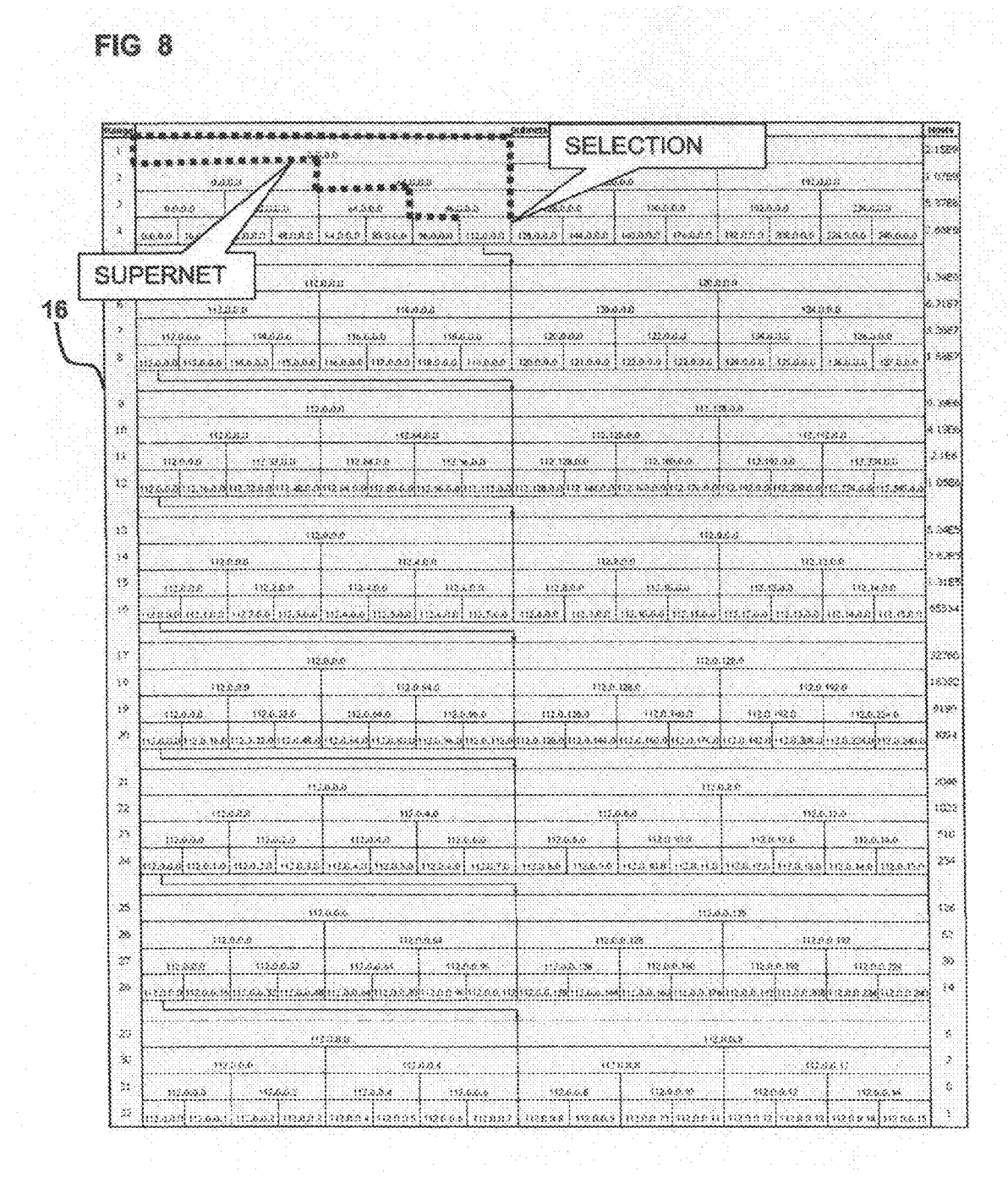

FIG. 8 shows an example of a user action resulting in the selection of the subnet block 112.0.0.0/4, indicated by the callout labeled SELECTION. In an actual system, this subnet block is highlighted to provide a visual confirmation of the action taken by the user. When a user selects a subnet block, this user action results in a recalculation and display of subnets and associated subnet IDs contained in all subtending subnet blocks in the dotted decimal format as shown. Note that the system and method preserves the hierarchical relationship of the subnets within the display.

Another helpful visual indicator resulting from the user selection of a subnet is a color highlight, such a green highlight, created in the system on the supernet blocks (highlighted in dotted outline in FIG. 8) above the selected subnet. This system and method, therefore, provides a visual indication of subnets and their associated supernets, as well as associated subnets (or sub-subnets). The supernet is indicated by a callout labeled "SUPERNET" in FIG. 8. Through this technique the user can easily see how a selected subnet summarizes up the hierarchy. When planning and implementing a complex data communication system based on a modern routing protocol such as OSPF, it is useful to know how a subnet summarizes.

Figure 9:
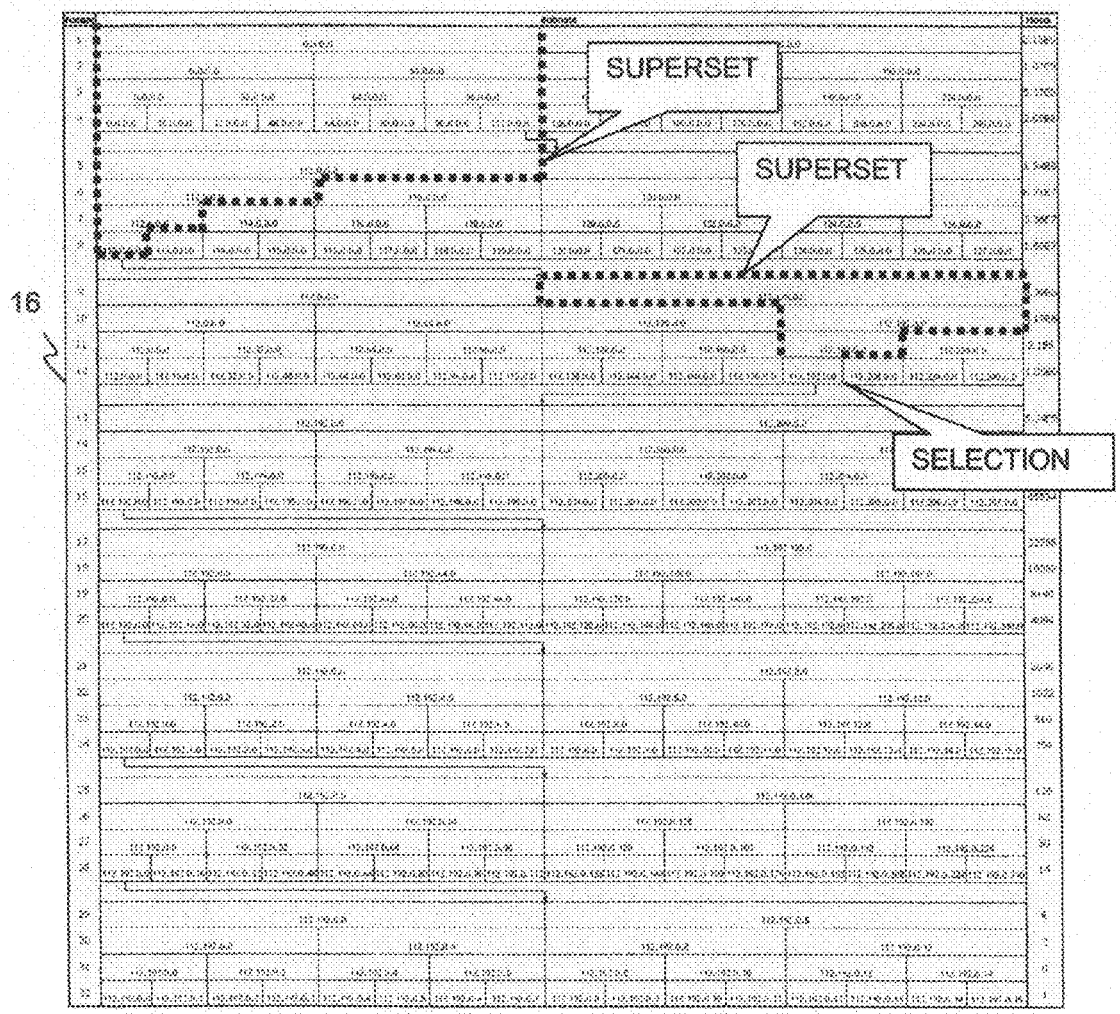

FIG. 9 shows the display that results from selecting a subnet further down the hierarchy. Again, the subnet IDs of the subnet blocks below the selected subnet are recalculated and displayed to reflect the user selection and preserve the hierarchical relationship between all subnets contained within the display 16. Also, the visual indication of how the selected subnet summarizes is updated. This process of navigation and display of subnets is maintained through the remainder of this system description.

Any subnet can be assigned attributes (status, description, etc.) by the user. Assigning certain attributes to at least one or all of the subnets and supernets will result in display of specific visual indicator on that subnet block as well as those subnet that are hierarchically related both above and below that subnet. In the illustration being described, the attributes are "Area," "Reserved," "Allocated," and "Assigned," which are described later herein. Other attributes may be assigned by the user depending upon needs of the user and/or the application in which the system and method will be employed.

Figure 10:
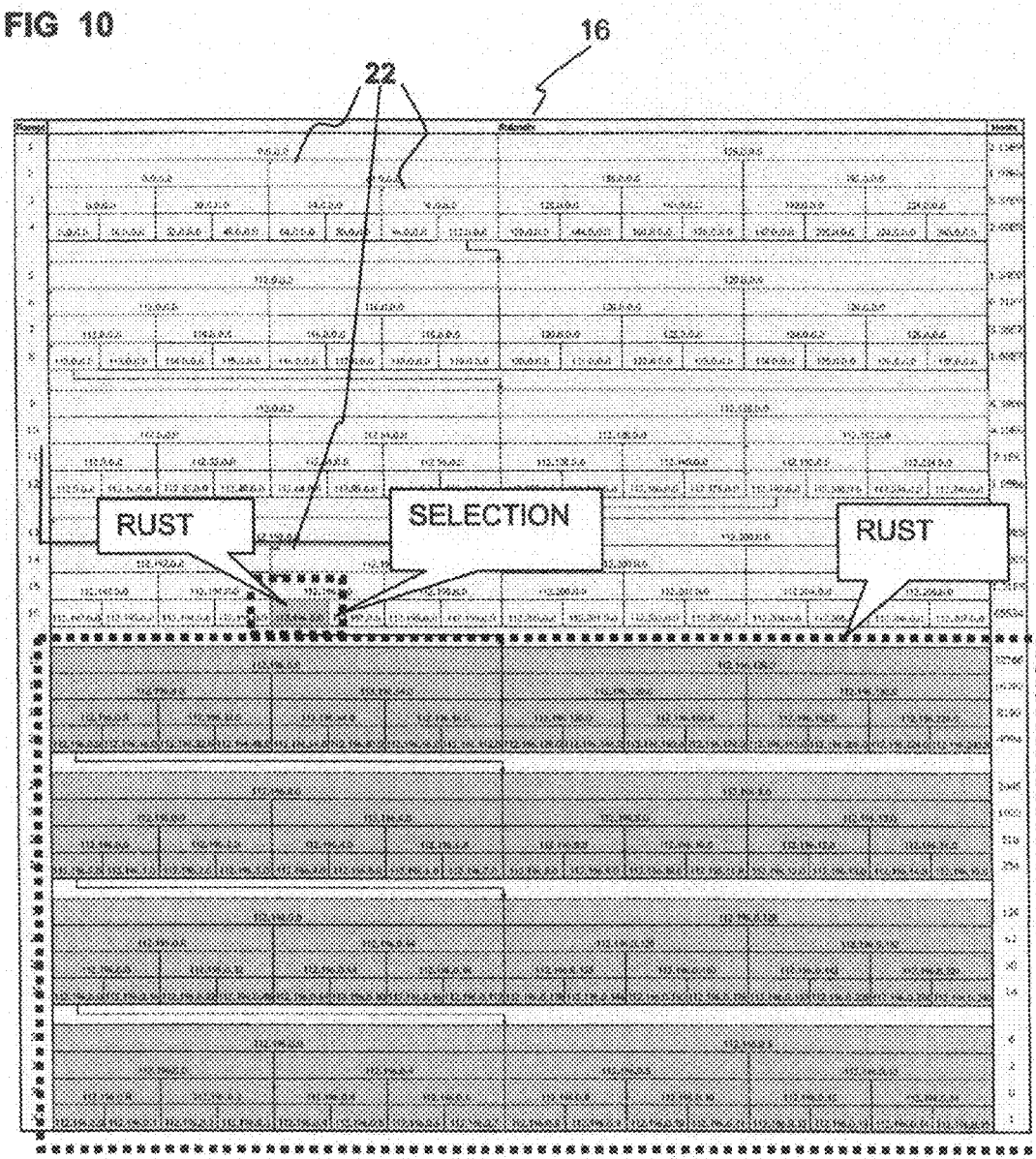

In FIG. 10, for example, the subnet 112.196.0.0/16, for example, has been assigned the status attribute of "Area". A subnet designated as an "Area" is defined within the OSPF specification. An "Area" includes all subnets hierarchically linked to the "Area" subnet and is shown visually in FIG. 10 by the rust color filled subnet blocks in an actual system, and indicated by the callout labeled RUST in FIG. 10.

Another visual indicator introduced upon the assignment with an "Area" attribute can be seen in the top left corner of those subnets in the summarization path and provides a general indication or utilization indicator 22 of the utilization of the subnet. This utilization indicator 22 persists as long as the subnet attribute exists. As attributes are assigned to many subnets, the utilization indicator 22 becomes a useful mechanism for navigating the subnet database. The utilization indicator contains four color coded bars that are related to the four status attributes mentioned earlier, namely, Area, Reserved, Allocated and Assigned. This will be seen in subsequent examples.

Figure 11:
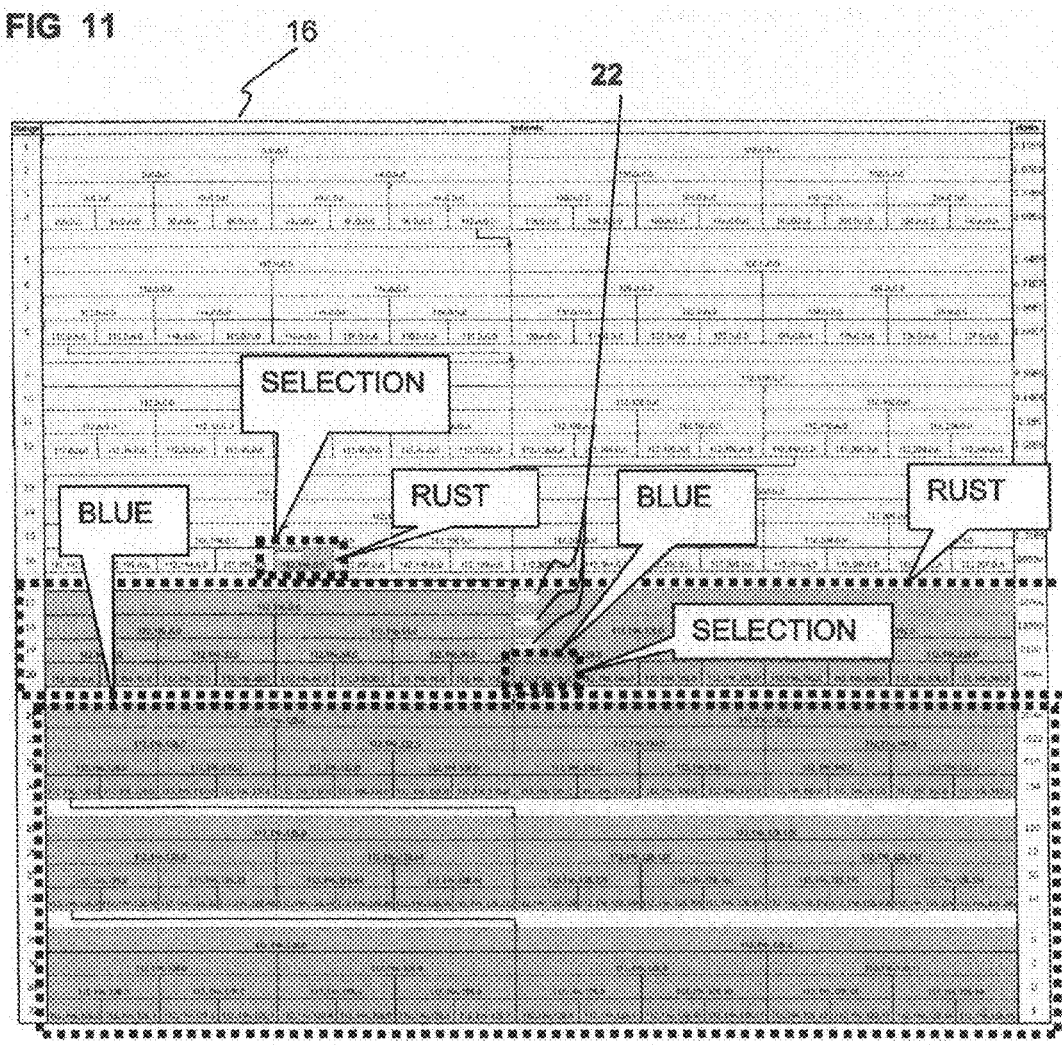

"Reserved" is another status attribute that can be assigned to a subnet. Reserving subnets is useful when planning for future network additions and changes. In FIG. 11 the subnet 112.196.128.0/20 has been assigned the status attribute of "Reserved". A "Reservation" includes all subnets hierarchically linked to the "Reserved" subnet and is shown visually in FIG. 11 by an indicia or label, such as a color blue in the illustration, filled subnet blocks in an actual system. BLUE and RUST are indicated in FIG. 11. The "Reserved" status attribute is reflected on the colored bar or utilization indicator 22 within the utilization indicator of supernets that are hierarchically linked above a reserved subnet.

Figure 12:
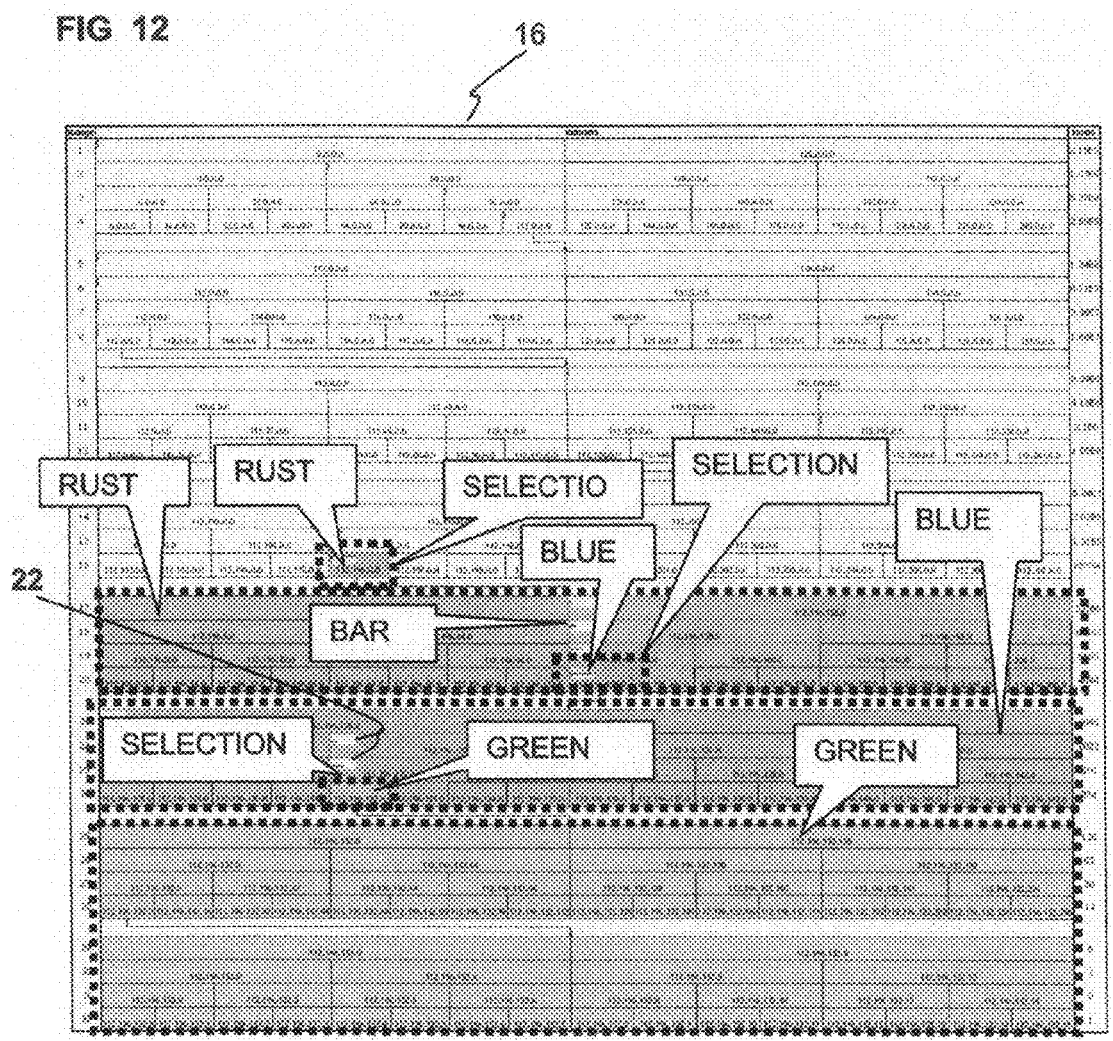
Figure 13:
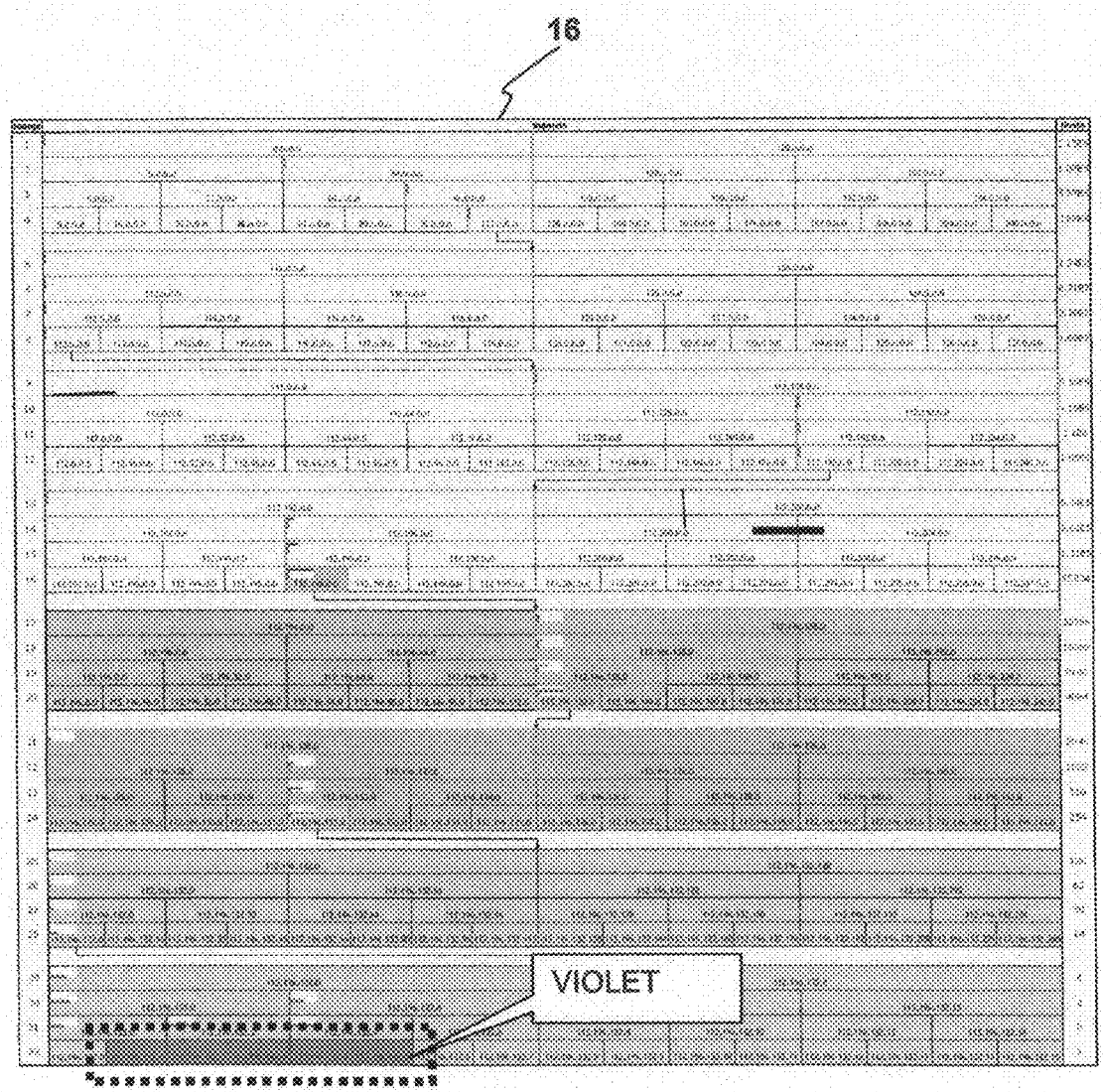

"Allocated" is another status attribute that can be assigned to a subnet. An allocated subnet is typically one that is currently in use within an IP network. Normal industry practice is to only assign IP addresses or IP address pool within subnets that have been allocated for a specific use. In the illustration of FIG. 12, the subnet 112.196.132.0/24 has been assigned the status attribute of "Allocated". An "Allocation" includes all IP address within the "Allocated" subnet and is shown visually in FIG. 12 by another indicia, such as a color green in the example, filled subnet blocks in an actual system, and indicated as GREEN in FIG. 12. The "Allocated" status attribute is reflected on the colored bar within the utilization indicator 22 of supernets that are hierarchically linked above an allocated subnet, indicated as BAR in the Figure.

"Assigned" means a specific IP address or range of IP addresses within a subnet that has been assigned.

Figure 30:
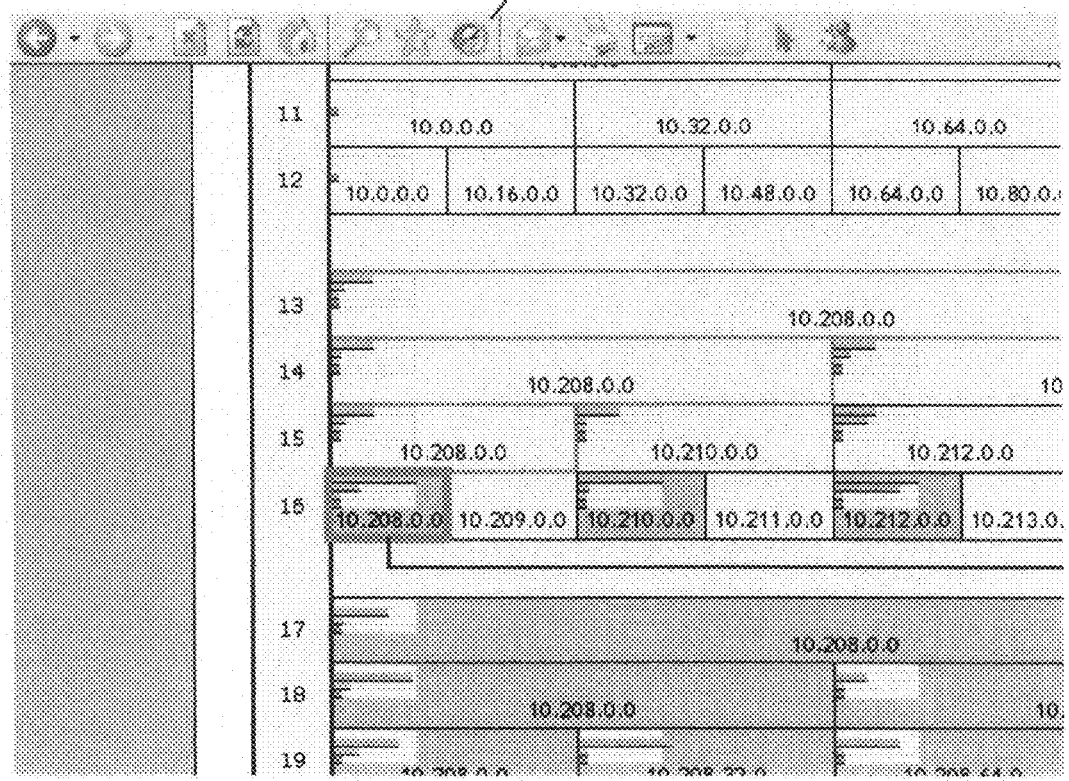
FIG. 30 shows an enlarged view of the utilization indicator 22 for a subnet.

FIG. 30 shows an enlarged view of the utilization indicator 22 for a subnet. Notice that each row 22a, 22b, 22c and 22d provide a visual indicia, display or meter of the attributes described earlier so that a user can quickly see the utilization and attributes for the subnet with which the utilization indicator is applicable. In the illustration being described, the Area, Reserved, Allocated and Assigned are provided in the color-coded rows 22a-22d, respectively.

Once a subnet has been allocated, individual IP addresses or ranges of IP address can be assigned within them. The subnet blocks in the last row in the display contain only one IP address. Assigned IP addresses are shown visually in FIG. 13 by indicia, such as the Violet color, filled subnet blocks in an actual system, and indicated by the callout as VIOLET in FIG. 13. Assigned IP address blocks are reflected on the colored bar within the utilization indicator of supernets that are hierarchically linked above them. As mentioned earlier, IP addresses may be assigned to components in the system, such as printers, servers, routers, computer or other components that require an IP address.

The invention is preferably implemented by a software application composed of a client graphical user interface (GUI), such as Microsoft Internet Explorer, an application/computer program running on a computer workstation or server and a relational database (e.g. Oracle or SQL) that creates and stores the subnets, IP addresses, attributes and other information shown and described herein. The following is an example of how the invention is used to navigate and assign a new subnet. The illustrative screen shots are from a system composed of an operator interface (Microsoft Internet Explorer), an application/computer program running on a web server, and an Oracle Database are used.

The task given to the operator in the illustration is to assign a subnet for core equipment (not shown) located at a facility, namely the Desoto Data Center in the illustration. This subnet must support up to 254 host addresses and fall within the private IP address range of 10.208.0.0/12.

Figure 14:
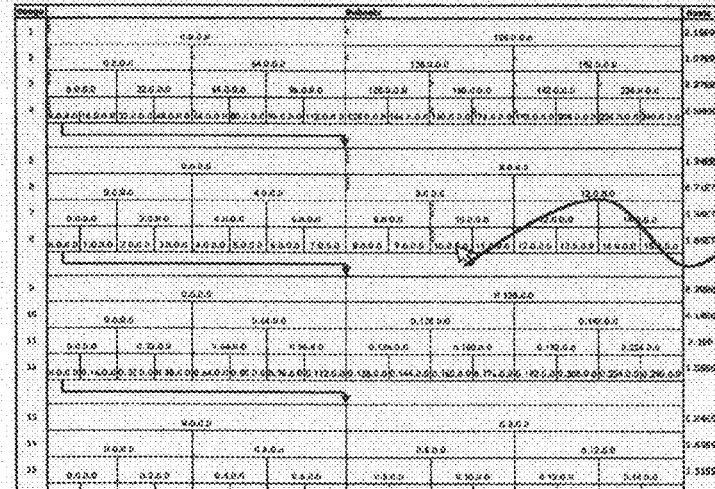

The user logs in and accesses the subnet planning and inventory software embodying the invention and is presented the screen display shown in FIG. 14.

The utilization indicators 22 referred to earlier can be seen in the top left corner of a number of subnet cells. The utilization indicators 22 provide a visual aid and guide for subnet navigation. To navigate further down the subnet hierarchy, the cursor 24 is placed over the subnet cell 10.0.0.0/8 and clicked once. This action brings up the next GUI or screen shown in FIG. 15.

Figure 15:
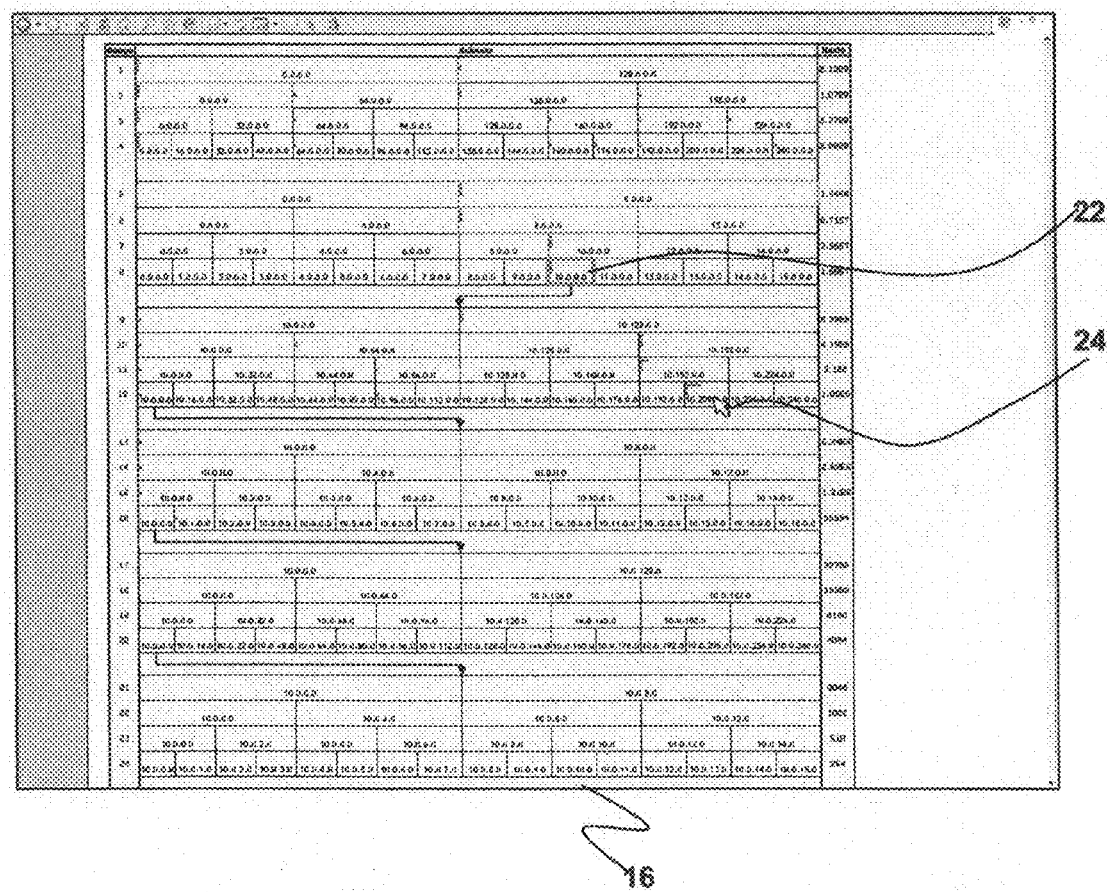

As shown in FIG. 15, once selected, subnet cell 10.0.0.0/8 14 is highlighted by an indicia, such as the color Red in the illustration, and the supernets that are hierarchically linked (summarization path) to this subnet are highlighted by another indicia, such as the color Green in the illustration. Note that the "/8" is identified by the Range in the left most column, which as explained earlier. The subtending subnets linked to the selected subnets are also updated to reflect the selection.

It is now possible to select the target address space by placing a cursor 24 (FIG. 15) over a subnet cell (10.208.0.0/12 in the illustration) and selecting this cell by, for example, clicking a button (not shown) on a mouse (not shown) once. This selecting action brings up the next screen shown in FIG. 16.

Figure 16:
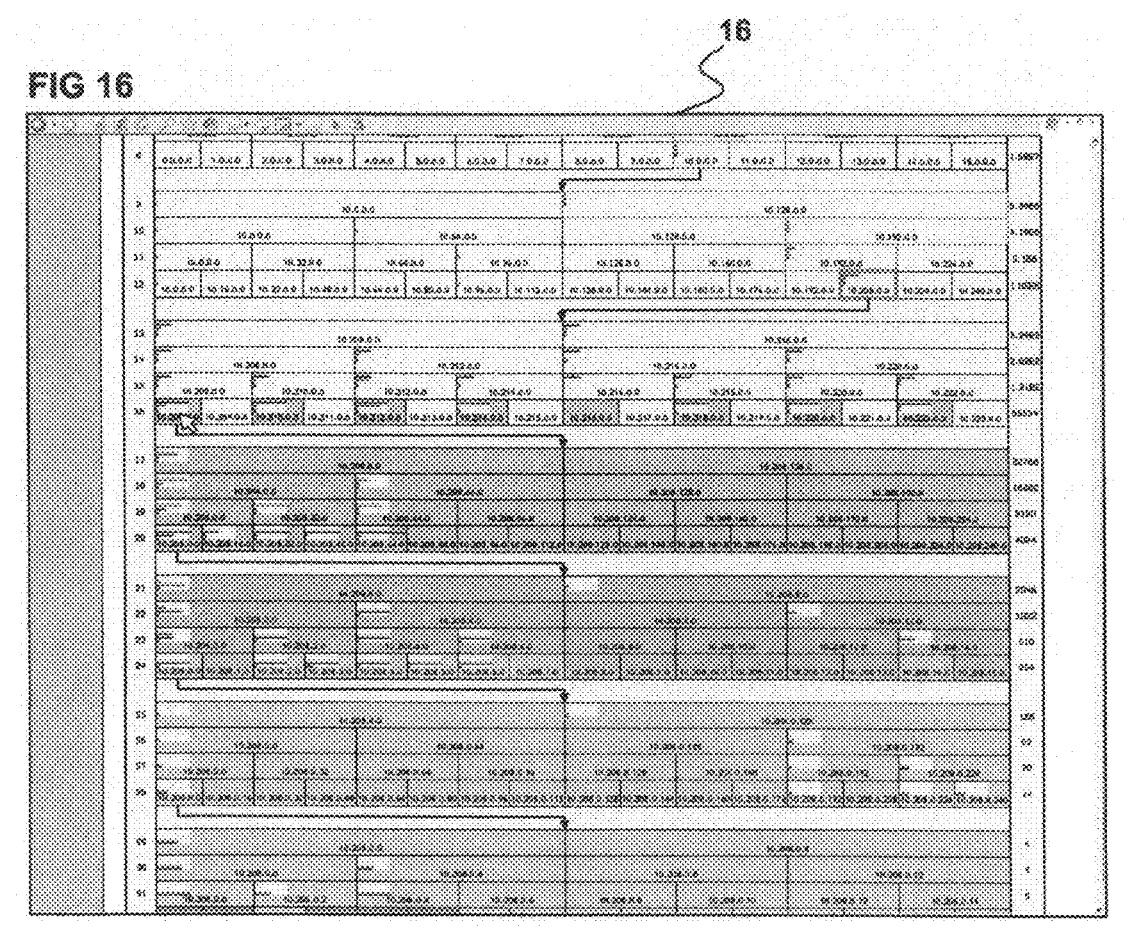

In FIG. 16, notice that the display has now been updated and populated to reflect the selection of subnet cell 10.208.0.0/12. Subnet cells 10.208.0.0/16, 10.210.0.0/16, 10.212.0.0/16, etc. are color coded Rust to indicate their status as "Area". In this example, the operator selects the subnet cell 10.208.0.0/16 and to access further details double clicks this cell. This brings up the next GUI or screen shown in FIG. 17.

Figure 17:
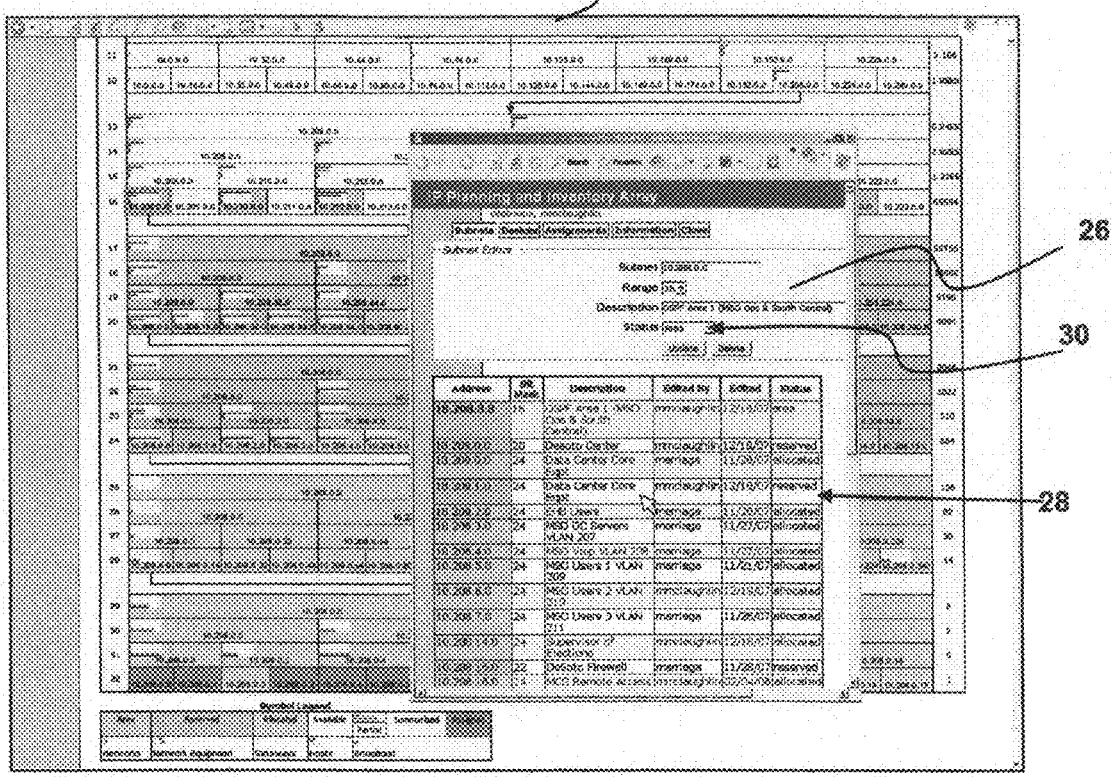
Figure 18:
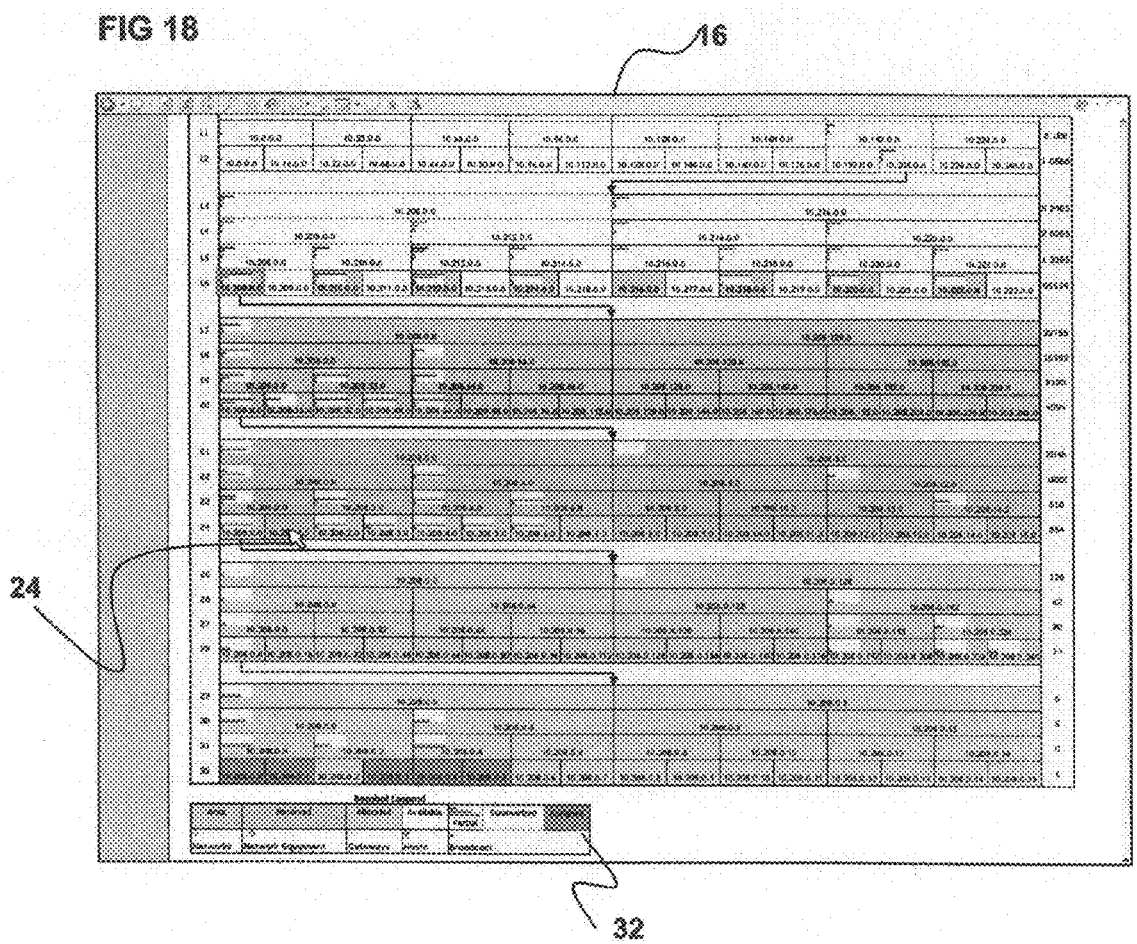

By selecting (e.g., by double clicking the mouse button on the mouse) the subnet cell 10.208.0.0/16, a subnet content and editing window 26 is displayed as shown in FIG. 17. In this window 26, the attributes of the selected subnet can be reviewed and modified. This window also displays information about other subnets contained within the selected subnet. The user can input information in each field, such as description of the equipment associated with the IP address, editor's name, date of editing and status. As an example, "Reserved" subnet 10.208.1.0/24 meets the criteria for the task being performed by the operator, so the operator assigns this subnet to the core equipment. Notice that subnet 10.208.1.0/24 (labeled 28 in FIG. 17) has now been reserved for Desoto Data Center Core Equipment. The operator then selects the status box 30 and changes the status of this subnet from "Reserved" to "Allocated".

In the illustration, the operator may be a system administrator having password or specialized access to the system and the ability to change allocations and reservations on demand. The operator now closes the subnet editor window 28 which brings up the display in FIG. 18. Notice that a symbol legend 32 may be provided to assist the user. The symbol legend providing the attributes and symbols and associated information pertaining to the fields in the GUI.

To edit the subnet 10.208.1.0, for example, the operator places the cursor 24 over the subnet cell and selects it by, for example, clicking the mouse button twice. This brings up the display in FIG. 19.

FIG. 19 shows a subnet editing window 34 for subnet 10.208.1.0/24. In the subnet editor window the subnet and Range fields are based on the selected subnet cell. The description 30 and status 38 fields are editable by the user as mentioned earlier. To complete the task of assigning a new subnet for the Desoto Data Center Core Equipment in the illustration, the status of "Allocated" is selected from the drop-down list of the Status field.

Thus, the system and method provide a unique system, process and procedure for displaying information about subnets and for maintaining subnets that is much more efficient than in the past.

Additional Considerations

Returning to FIG. 7, further explanation of the system and method is provided.

Figure 21A:
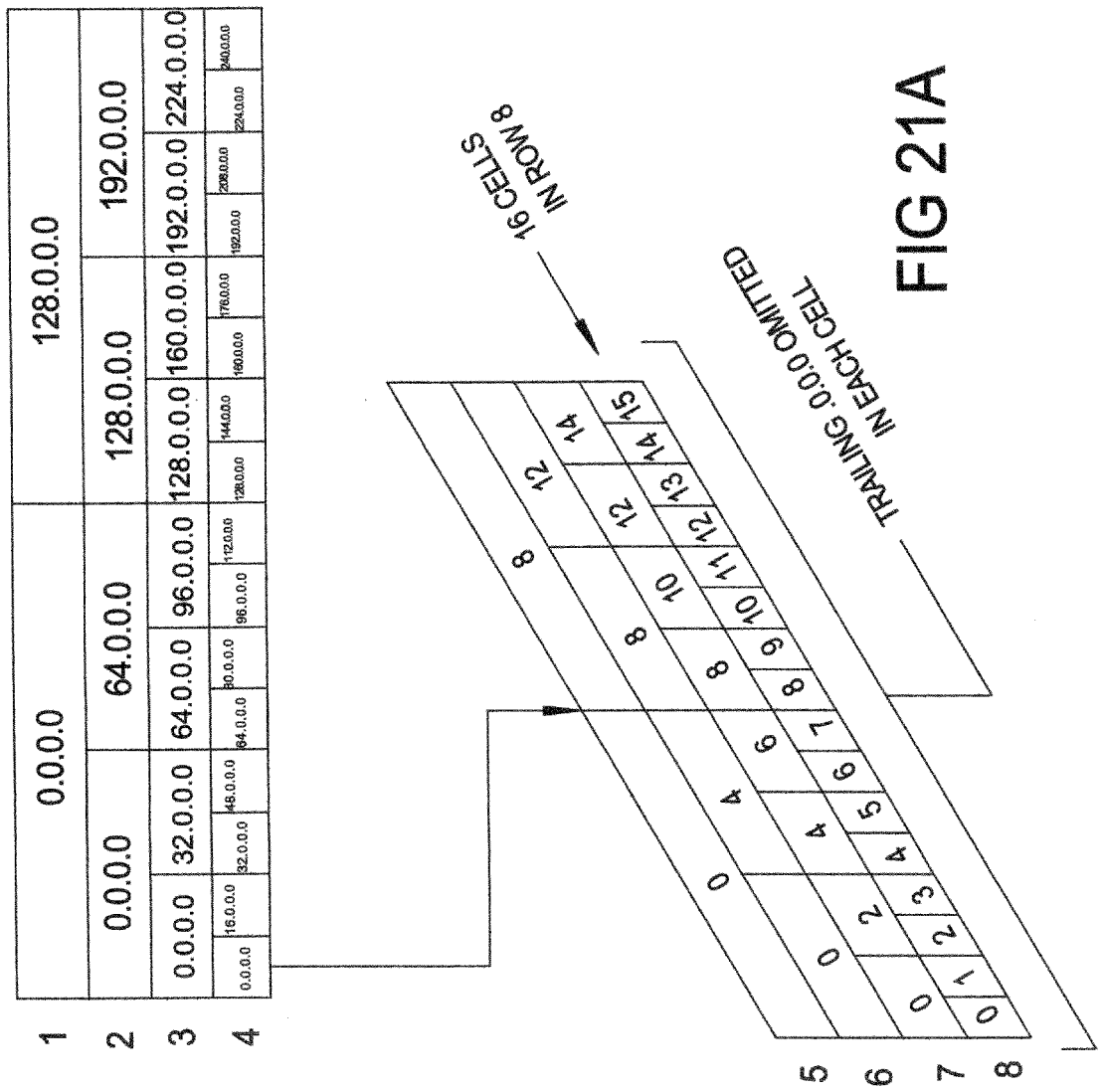
FIG. 21A is a representation of ranges 5-8, subtending from cell 0.0.0.0 in range 4.

FIGS. 21 and 21A illustrate ranges 1-4 of FIG. 7 and also some of the subnets in ranges 5-8. In ranges (or rows) 5-8, the trailing "0.0.0.0" in each cell has been omitted for simplicity of illustration. As indicated, the row corresponding to range 8 contains 16 cells, which are also shown in FIG. 7.

FIG. 21 is a complete rendition of the subnets of rows 5-8, to which the cells in row 4 lead. Each cell in row 4 leads to its own group of subnets. The row labeled A in FIG. 21 contains 16 cells, as does row 8 in FIG. 21A. The overall collection of cells 12 in FIG. 21 contains 256 cells in row 8, sixteen in each of the groups labeled 12. This corresponds to the addresses ranging from 0000 0000 to 1111 1111 in the first octet of the IP address.

Figure 22:
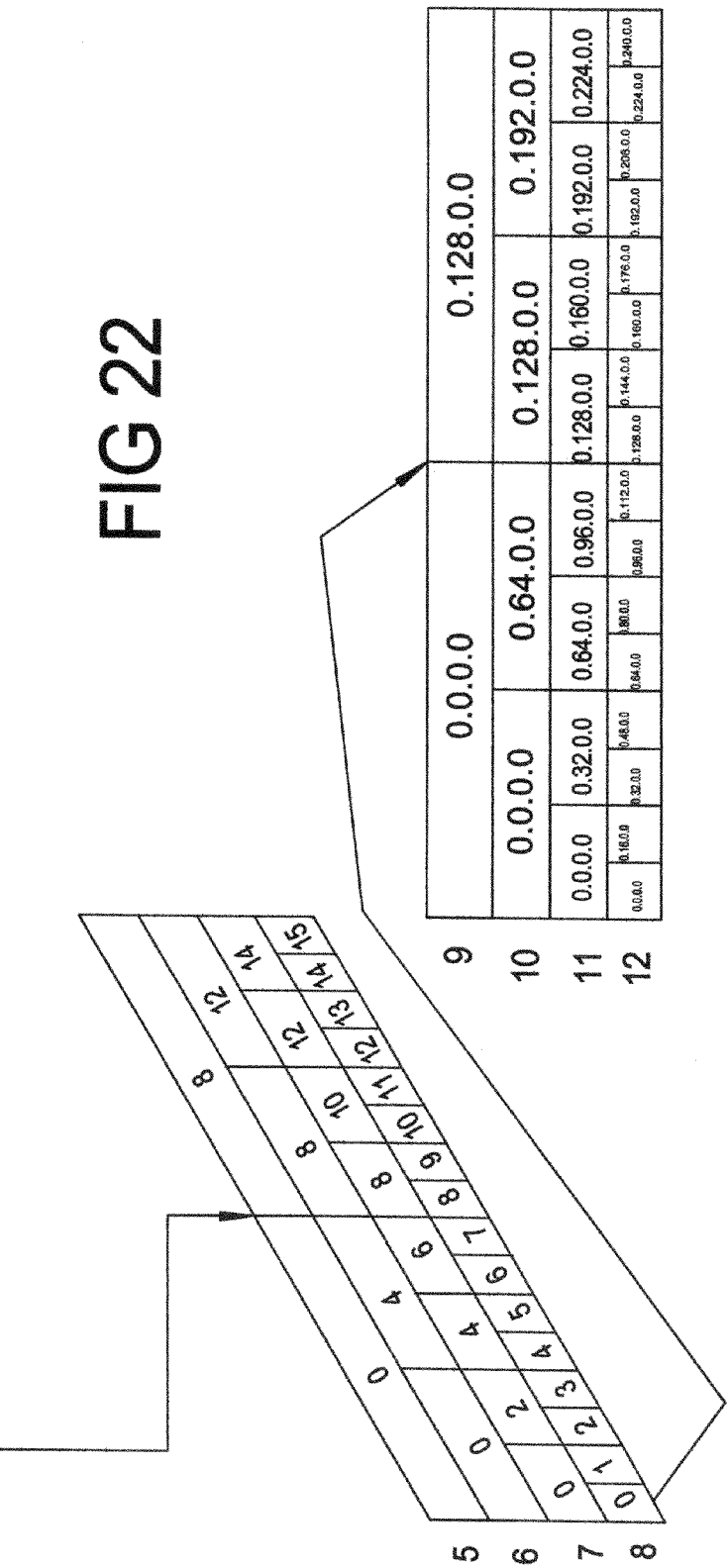

FIG. 22 repeats part of FIG. 21, and adds rows 9-12 from FIG. 7, which subtend from the cell 0 in row 4. As in FIG. 21, the trailing "0.0.0.0" has been omitted for rows 5-8. Row 12 contains 16 cells.

Figure 23:
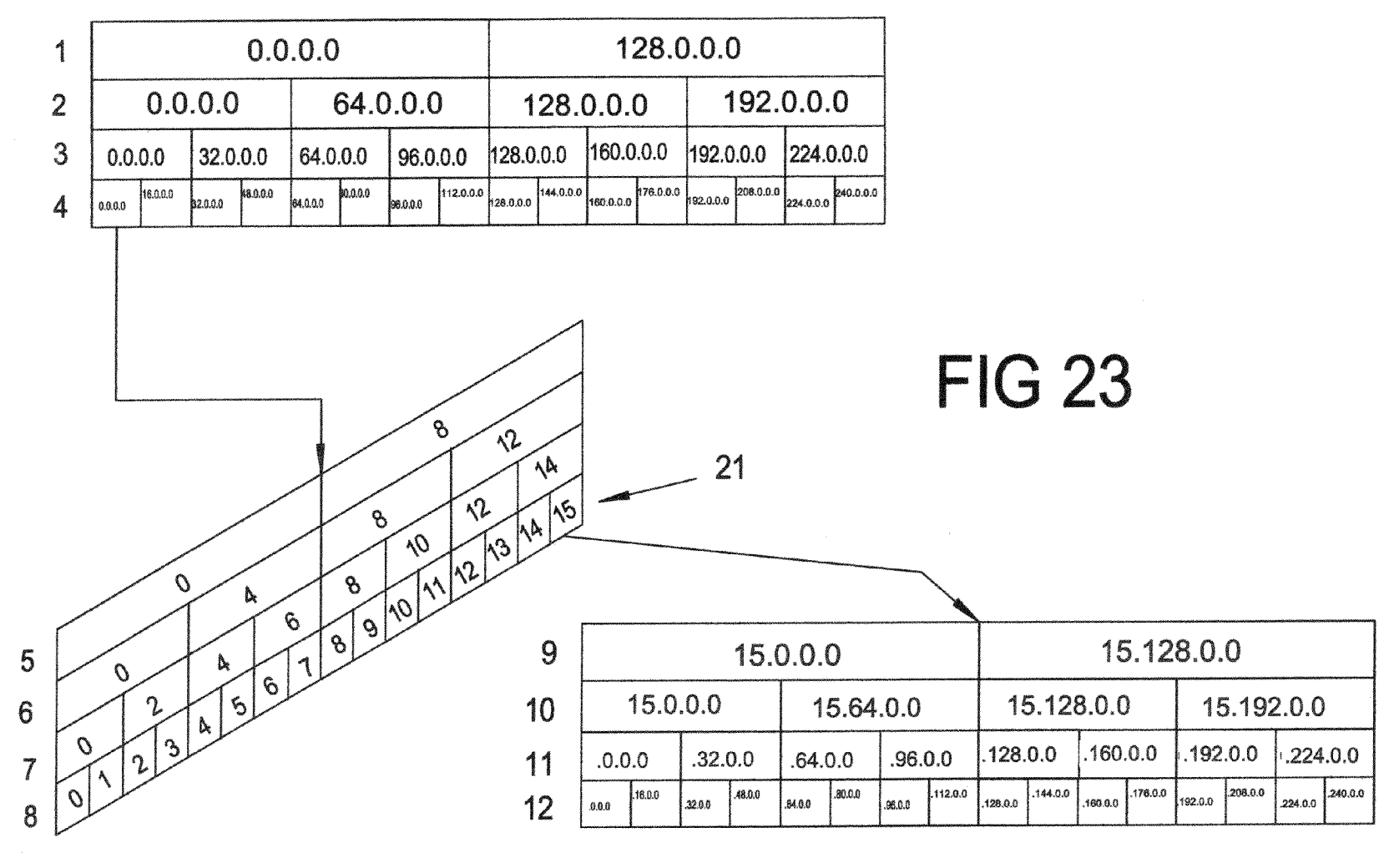
Figure 24:
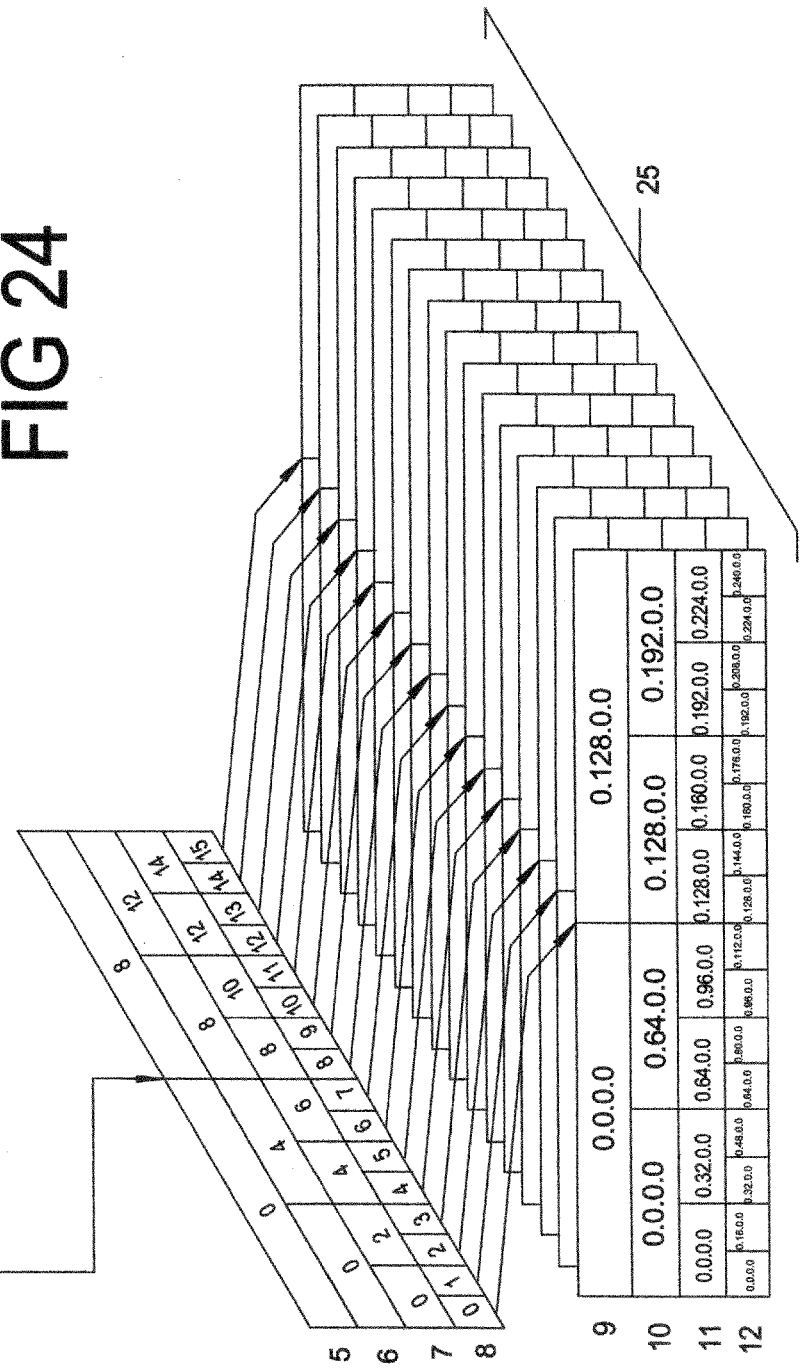

FIG. 23 is similar to FIG. 22, but shows the subnets depending from cell 21. FIG. 24 shows the complete set of subnets 25 subtending from the entire row 8.

Figure 25:
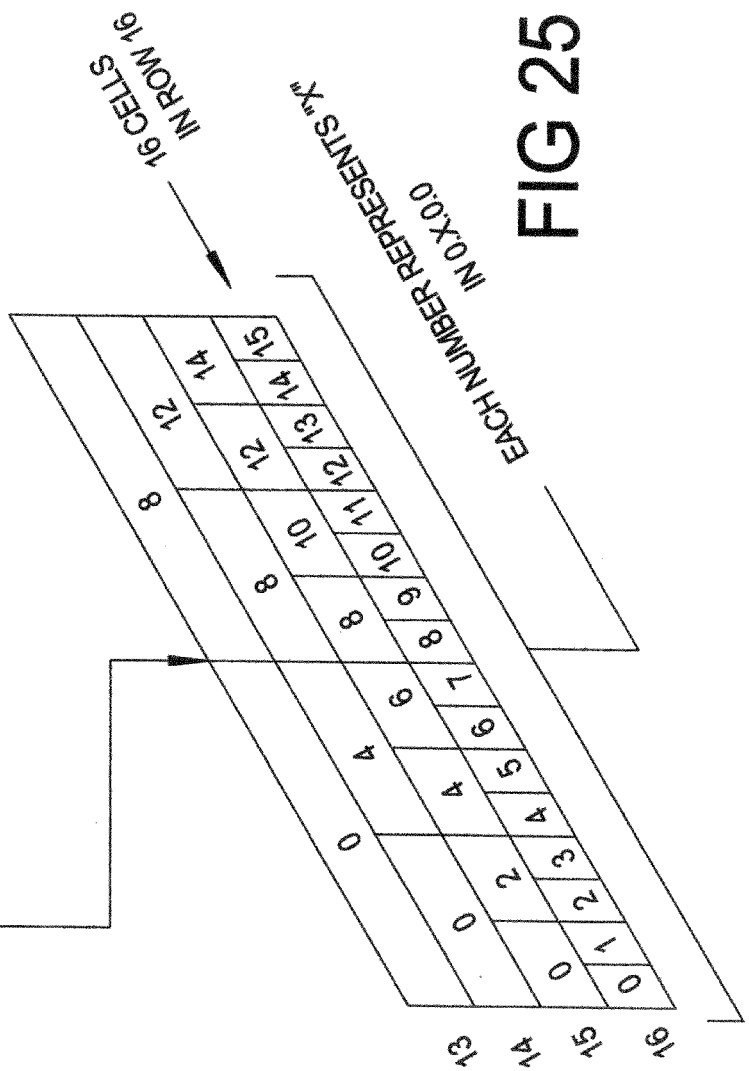
Figure 26:
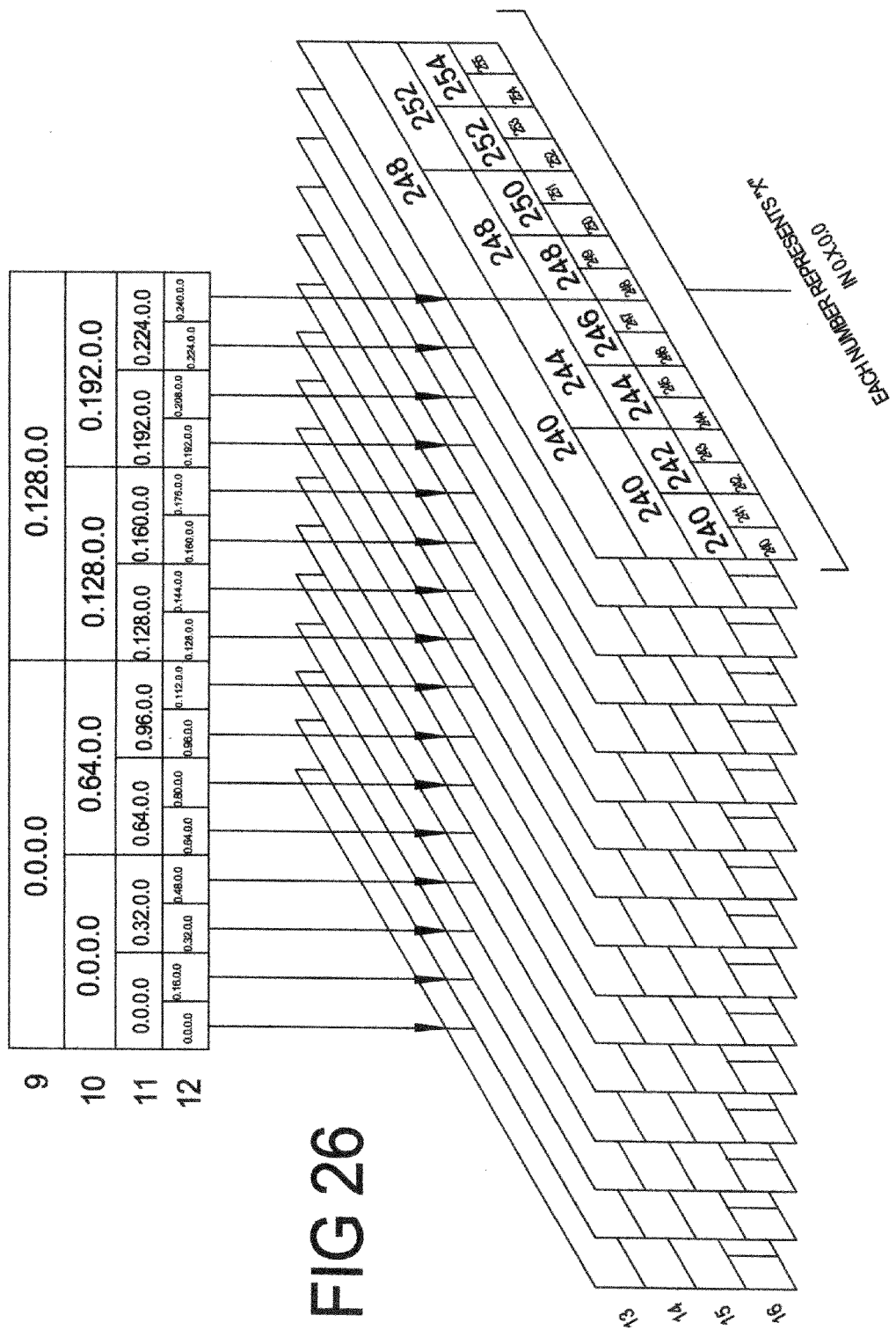
Figure 27:
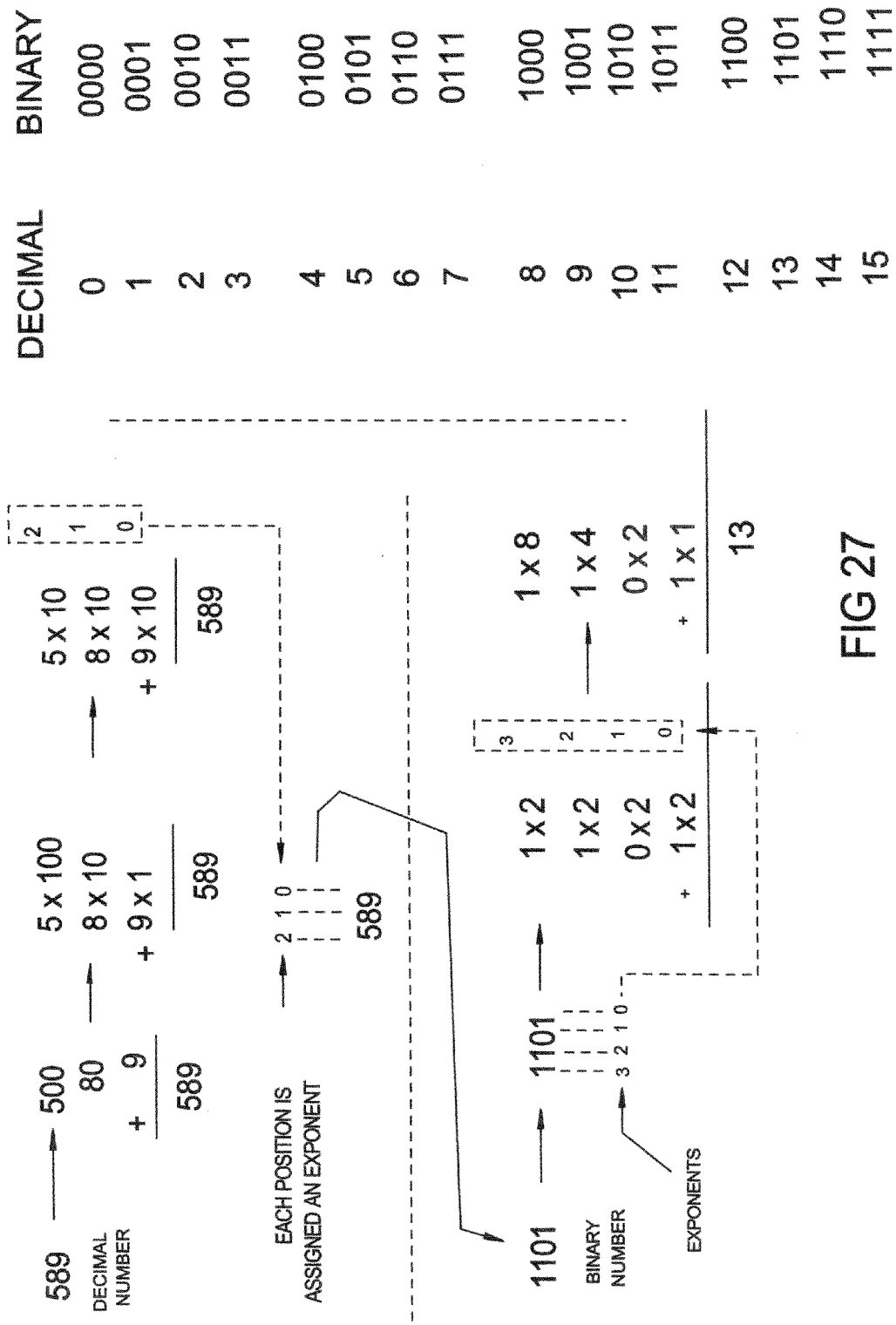
FIG. 27 is an overview of the binary number system.

FIG. 25 shows subnets depending from the first cell in row 12. In rows 13-16, the IP address has been abbreviated, as indicated. FIG. 26 represents the complete situation depending from row 12.

This pattern repeats for the rest of the rows/ranges in FIG. 7.

Figure 28:
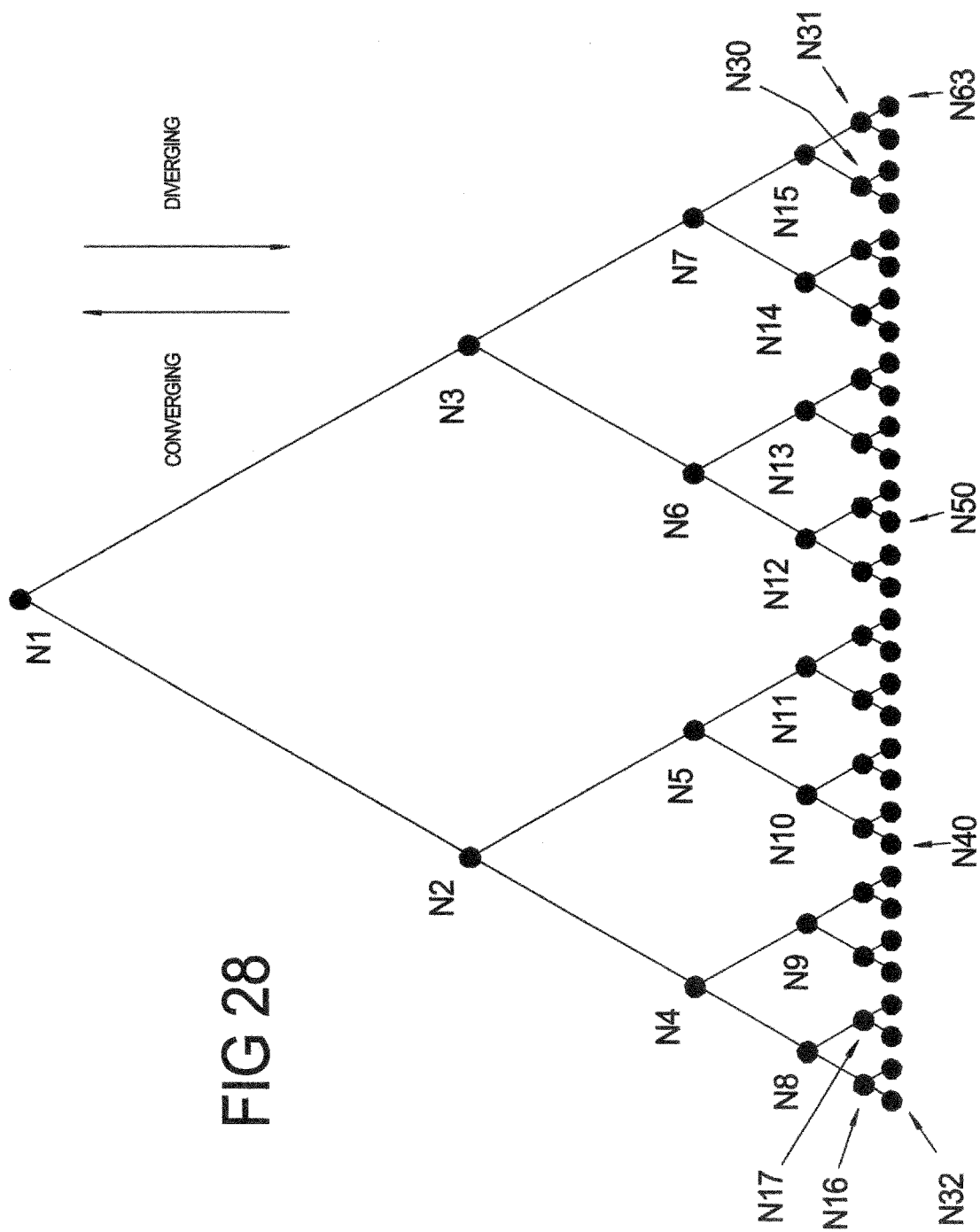
FIG. 28 represents a binary tree, as the term is used in graphical network theory.

Thus, it should be understood that the subnets of FIG. 7 are arranged in the form of a binary tree 40, as partially indicated in FIG. 28. Each node N splits into two branches, which then terminate on respective other nodes.

Two directions can be defined: "converging" and "diverging." The converging direction is that in which the branches converge into the single originating node. The diverging direction is opposite: that in which the branches diverge from each other.

The concept of a "level" can be applied. Node N1 represents the first level. Nodes N2 and N3 occupy the second level. Nodes N4, N5, N6, and N7 occupy the third level, and so on. All nodes in a given level have the same number of branches to their respective originating node.

The converging direction can also be defined by reference to the levels. If one moves from one level to another and if the destination level contains fewer nodes, then one has moved in the converging direction. The diverging direction is opposite: the destination level contains more nodes.

The tree suggests definitions of "subset" and "superset." A subset of a node N2, for example, includes all nodes having branches which lead to the node N2. This includes nodes N4, N5, N8, N9, N10, N11, N16 through N23, and N32 through N47 in the illustration. These nodes subtend node N2.

A superset of node includes all nodes having branches which lead from the node. Nodes N5, N2, and N1 are supersets of node N11, for example.

The number of nodes doubles, as one advances through the levels. For example, level one contains one node (N1). Level 2 contains 2 nodes (N2 and N3). Level 3 contains four nodes (N4, N5, N6, and N7) and so on.

In one form of the invention, binary tree 40 of FIG. 28 is superimposed onto a network containing 2**32 nodes or subnets. The resulting tree contains 32 levels. The levels correspond to the range-numbers in FIG. 7.

In FIG. 7, the invention displays a cell for each node, or subnet, for levels 1-4. However, beginning with level 4, only some of the nodes, or subnets in each level are displayed. For example, in level 5, only two nodes are displayed (i.e., 0.0.0.0 and 8.0.0.0).

The user can select any node and/or request that other nodes in a level be displayed, by selecting nodes. As FIG. 8 indicates, selecting 112.0.0.0 in level 4 selects two different nodes in level 5. This has a cascade effect on the higher levels, as also shown in FIG. 8.

Figure 29:
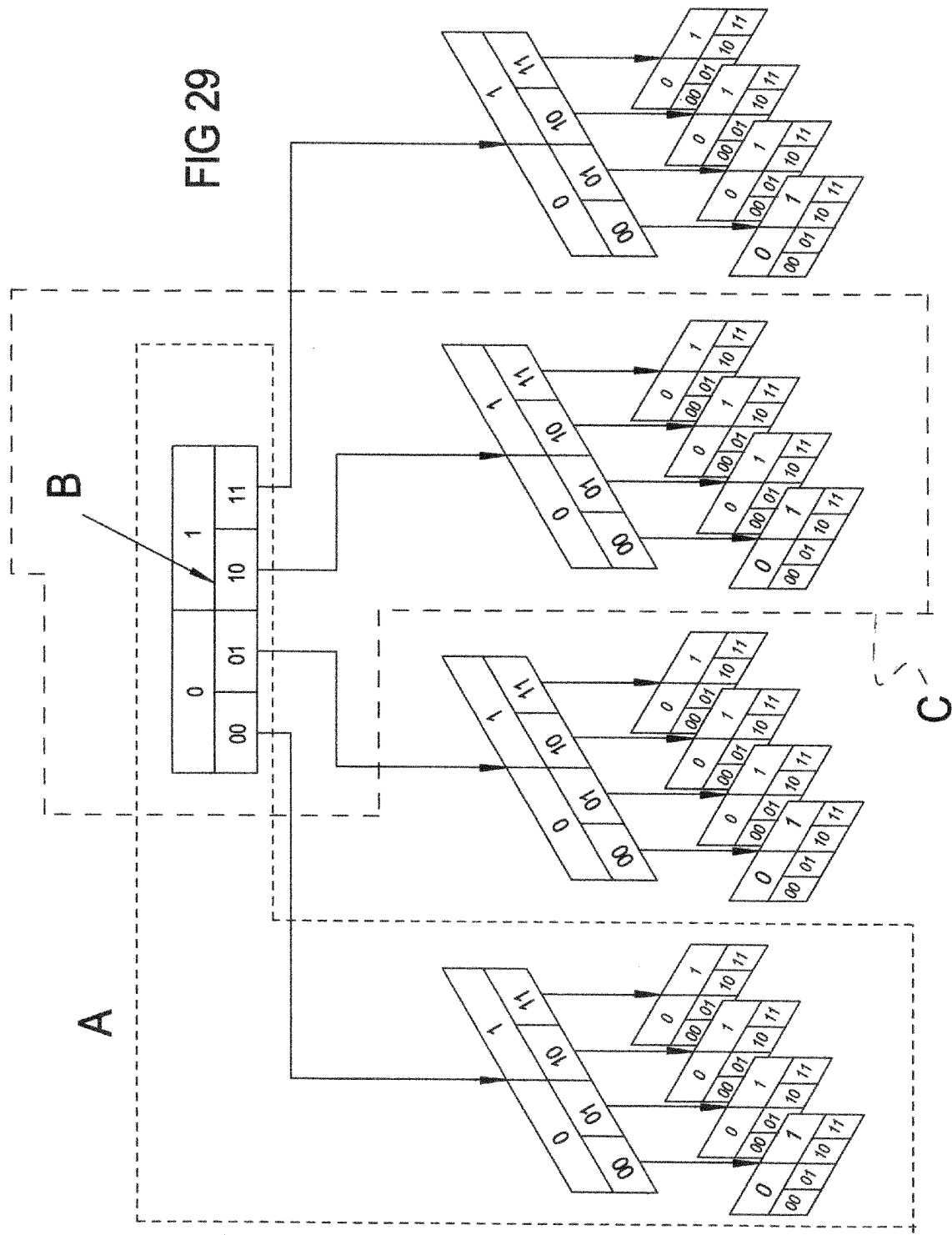
FIG. 29 contains content of FIG. 20, with additions to provide a simpler explanation of one operation implemented by the invention.

This effect can be more simply illustrated with reference to FIG. 20, which is repeated as FIG. 29. Initially, the display may present the information present in dashed box A. When the user selects cell B (analogous to selecting cell 112.0.0.0 in row 4 in FIG. 8), the information in dashed box C is displayed, and replaces that of box A.

The invention thus can be viewed as displaying nodes (corresponding to subnets) in the binary tree 40. The user can select a node and thereby cause a subset and supersets of the node to be displayed. The user can further select nodes in the subset to cause yet further nodes to be displayed.

A coordinate system can be defined on the binary tree 40 having the coordinates (level, node). Consistent with FIG. 7, when read with FIG. 28, "level" spans from 1 to 32 and "node" spans from 1 to 2**32.

In one form of the invention, the IP addresses of all subnets are displayed in frames, which are identical in format. This can simplify programming somewhat, during initial construction and also during routine maintenance. For example, in FIG. 7, one frame spans from range (row) 1 to range (row) 4. It contains IP addresses of two subnets in row 1, four subnets in row 2, eight subnets in row 3, and sixteen subnets in row 4. Thus, IP addresses of thirty subnets are contained and shown in the frame.

Another frame spans from row 17 to row 21. Again, it contains IP addresses of two subnets in row 17, four subnets in row 18, eight subnets in row 19, and sixteen subnets in row 20. Again, notice that IP addresses of thirty subnets are contained in the frame.

When the user makes a request, as described earlier in FIG. 8, the system responds by presenting additional, identical frames, but with different content.

Any two frames contain subnets which correspond to each other or are counterparts to each other. For example, row 1 in FIG. 8, contains two subnets and is similar to row 17, which also contains two subnets. Similarly, rows 2 and 18 both contain four subnets, and thus are similar.

In addition, other information may be overlaid over the frames as shown and described earlier relative to FIGS. 17 and 19.

However, as the right column of FIG. 7 indicates, the different rows of IP addresses refer to subnets which contain different numbers of hosts. For example, the two subnets of row 13 contain 5.24E5 hosts. Those of row 21 contain 2045 hosts.

Referring back to FIG. 28, one definition of "subtend" will be given. Node N9 in FIG. 28 corresponds to the cell in range 3 in FIG. 7, which contains the IP address 32.0.0.0.

The first octet in this IP address, represented by the decimal number 32, is 00100000. All nodes which "subtend" from this node will have their first octet of the form 001XXXXX, wherein "X" represents either a 1 or 0. From another point of view, since the range is 3, and since the range is the first three bits of the IP address, all subtending nodes will the same first three bits, namely, 001. Therefore, nodes which "subtend" from another node N have the same value of the range of node N. That value is 001 for a range of 3, in the example above.

The concept of "rank" can be introduced. A level ranks above another if it contains fewer nodes, that is, has a lower number. Level 2 ranks higher than level 5.

In one form of the invention, the system displays the full or partial binary tree 40 in which the nodes represent subnets. In the case of FIG. 7, ranges or levels 1-4 are always fully displayed to the user. That is, all nodes in levels 1-4 are represented (although when a user selects a node, additional information is displayed about the selected node).

By default, a set of branches subtending from the node having the coordinate (4, 1) is displayed, that is, from the node or cell containing 0.0.0.0 in range 4. This set of branches spans from levels 5 through 8.

In addition to the branches subtending from this node, a similar set of branches exists. Each depends from one of the other 15 cells in range 4, but they are not displayed at present.

Similarly, six more sets of branches are displayed in FIG. 7 by default, each depending from a cell containing 0.0.0.0, and six such cells are present, one in each of ranges 8, 12, 16, 20, 24, and 28.

For each of these six branches, fifteen other sets of branches exist, but are not displayed.

When a user selects a cell or node the system displays branches subtending from that cell if not displayed already. FIG. 8 provides an example. In FIG. 8, all nodes in the displayed branches have the same range-value as the selected node, namely, 0111XXXX in the first octet.

However, the displayed branches are a partial representation of the binary tree.

Therefore, the invention displays a full representation of nodes/subnets for a first set of levels, namely, levels 1 through 4 in FIG. 7. The invention displays a partial representation of nodes for the remaining levels.

When the user selects a node, the invention again displays the full representation, and a partial representation dictated by the node selected.

The user can continue to select a sequence of nodes, and the process repeats, thereby allowing the user to select any of the 2E 32 nodes available in the system.

In the coordinate system, wherein the coordinates are (Level, Node), it should be observed that the numbering of the nodes will follow a convention established by the designer.

For example, in FIG. 28, node 13 can have the coordinates (4, 6), because it is located in level 4, and in position 6. Alternately, the node-number N can be numbered in an absolute sense. For example, the coordinates could be (4, 13) since node 13 is the thirteenth node from the first node.

The term "10E4" is scientific notation, and represents 10 raised to the fourth power. Similarly, "2E6" represents 2 raised to the sixth power.

From a programming perspective, the invention comprises a mapping of a database to the tree shown in FIG. 28. That is, the database contains one or more records for each node/subnet. When a user selects a node, software detects the selection, and displays an icon representing the node, together with a context representing the node's position in the tree. If additional information is required about the node, the software retrieves the records mapped to the selected node.

In addition, nodes in higher and lower levels, such as subnets and supernets, can be displayed. Such display involves an indexing operation, wherein the coordinates (for example, (L, N)) of the selected node are appropriately modified to indicate the desired nodes, and icons for the desired nodes are displayed, together with information from the database, if needed.

In the illustration being described, the following hardware and software may be used: computer monitor, computer (PC or server) data storage device (hard drive, electronic memory) keyboard, mouse, database software (SQL, Oracle), web server application (IIS for Windows Server), graphical user interface (Internet Explorer, Firefox, etc.).

Numerous substitutions and modifications can be undertaken without departing from the true spirit and scope of the invention. What is desired to be secured by Letters Patent is the invention as defined in the following claims.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A system for presenting information about subnets in a network, comprising:
   a) a display which represents some of the subnets; and
   b) a detecting and displaying system for
      i) detecting selection of a displayed subnet A by a user and, in response,
      ii) displaying on said display at least one frame comprising a plurality of rows of cells arranged in a hierarchy following said selected subnet A,
      said detecting and displaying system recalculating and displaying each cell in said plurality of rows of cells of said at least one frame in response to said user's selection so that each cell within each or said plurality of rows of cells is populated and displayed with a subset of said selected subnet A in a dotted decimal format;
      said plurality of rows of cells in said at least one frame being grouped in a hierarchy, with each cell in said plurality of rows of cells being a subnet and representing a range of binary numbers corresponding to a range of network addresses, respectively, that subtend from said subnet A;
      a first one of said plurality of rows of cells within said at least one frame comprising a plurality of cells and each of said plurality of cells being represented by two cells in a second one of said plurality of rows of cells in said at least one frame so that a number of said plurality of cells in said second one of said plurality of rows of cells within said at least one frame doubles compared to a number of cells in said first one of said plurality of rows of cells, said second one of said plurality of rows of cells immediately succeeding said first one of said plurality of rows in said at least one frame;

each cell in said first one of said plurality of rows of cells in said at least one frame is subdivided into two cells in said second one of said plurality of rows of cells in said at least one frame and said range of binary numbers represented by each of said two cells will be one-half of the range of binary numbers represented by said cell in said first one of said plurality of rows of cells.

2. The system according to claim 1, in which a status of at least one of said subnet A or said subnet subtending said subnet A is displayed within at least one cell representing at least one of said subnet A or said subnets.

3. The system according to claim 2, in which the status includes at least one of the following (1) whether subnets are currently active, assigned or allocated or (2) whether subnets are reserved for future use.

4. The system according to claim 3, in which the number of subnets which can be selected for display exceeds the number 2 raised to the 25th power.

5. The system according to claim 1, in which the detecting and displaying system detects selection of a subnet B within the subnet A, and displays a subnet C of subnet B.

6. The system as recited in claim 1 wherein said at least one frame comprises a first frame and an immediately succeeding second frame;

a first row of said plurality of rows of cells in said immediately succeeding second frame being a subdivision of a selected cell in a last row of said plurality of rows of cells of a last row of said first frame.

7. The system as recited in claim 1 wherein said at least one frame comprises eight frames, with each frame comprising four rows of said plurality of rows of cells, with each succeeding row containing twice as many cells compared to a row of said plurality of rows of cells that it succeeds.

8. The system as recited in claim 7 wherein each cell in the eighth frame of said at least one frame represents a subnet of a single network address.

9. The system as recited in claim 7 wherein each of said eight frames each comprises a first row having two cells, a second row having four cells, a third row having eight cells and a fourth row having sixteen cells.

10. The system as recited in claim 9 wherein said two cells of said first row is a subdivision of the range of binary numbers represented by a single cell in the fourth row of an immediately preceding frame.

11. The system as recite in claim 1 wherein said detecting and displaying system displays on said display a plurality of frames arranged in a hierarchy, with the first row of said plurality of row of cells in each following frame being a subdivision of a cell in a last row of said plurality of rows of cells in said preceding frame.

12. The system as recited in claim 11 wherein said plurality of frames consists of eight frames, each consisting of four rows of said plurality of rows of cells.

13. The system as recited in claim 1 wherein a cumulative total of said plurality of rows of cells equals thirty two.

14. For a network which contains too many subnets to represent on a desktop display simultaneously, a method of presenting information about the subnets, comprising:

a) on a display, presenting some of the subnets, but not others; and b) detecting selection of a subnet by a user and, in response, displaying on said display at least one frame comprising a plurality of rows of cells arranged in a hierarchy following said selected subnet A, said detecting and displaying system recalculating and displaying each cell in said plurality of rows of cells of said at least one frame in response to said user's selection so that each cell within each or said plurality of rows of cells is populated and displayed with a subset of said selected subnet A in a dotted decimal format;

said plurality of rows of cells in said at least one frame being grouped in a hierarchy, with each cell in said plurality of rows of cells being a subnet and representing a range of binary numbers corresponding to a range of network addresses, respectively, that subtend from said subnet A;

a first one of said plurality of rows of cells within said at least one frame comprising a plurality of cells and each of said plurality of cells being represented by two cells in a second one of said plurality of rows of cells in said at least one frame so that a number of said plurality of cells in said second one of said plurality of rows of cells within said at least one frame doubles compared to a number of cells in said first one of said plurality of rows of cells, said second one of said plurality of rows of cells immediately succeeding said first one of said plurality of rows in said at least one frame;

each cell in said first one of said plurality of rows of cells in said at least one frame is subdivided into two cells in said second one of said plurality of rows of cells in said at least one frame and said range of binary numbers represented by each of said two cells will be one-half of the range of binary numbers represented by said cell in said first one of said plurality of rows of cells.

15. The method according to claim 14 and further comprising the step of:

d) displaying status information about subnets within the displayed subset.

16. The method according to claim 15, and further comprising the step of:

e) highlighting a superset of the selected subnet.

17. The method according to claim 15, and further comprising the step of:

f) highlighting a subset of the selected subnet.

18. The method according to claim 15, and further comprising the step of:

g) after selection of a subnet,
   i) presenting a menu which accepts information about the subnet,
   ii) accepting information from a user through the menu,
   iii) storing the information, and
   iv) at a later time, when the subnet is selected, presenting the information.

* * * * *